US012494189B2

(12) United States Patent
Goto et al.

(10) Patent No.: US 12,494,189 B2
(45) Date of Patent: Dec. 9, 2025

(54) SOUND ABSORPTION DEVICE

(71) Applicants: KABUSHIKI KAISHA TOSHIBA, Tokyo (JP); Japan Aerospace Exploration Agency, Tokyo (JP)

(72) Inventors: Tatsuhiko Goto, Kawasaki Kanagawa (JP); Akihiko Enamito, Kawasaki Kanagawa (JP); Kenichiro Nagai, Chofu Tokyo (JP); Osamu Nishimura, Kawasaki Kanagawa (JP); Takahiro Hiruma, Tokyo (JP); Tetsuya Doi, Kokubunji Tokyo (JP); Keiichiro Iwanaga, Kokubunji Tokyo (JP)

(73) Assignees: Kabushiki Kaisha Toshiba, Kawasaki (JP); Japan Aerospace Exploration Agency, Chofu (JP)

( * ) Notice: Subject to any disclaimer, the term of this patent is extended or adjusted under 35 U.S.C. 154(b) by 326 days.

(21) Appl. No.: 18/176,388

(22) Filed: Feb. 28, 2023

(65) Prior Publication Data

US 2023/0343317 A1 Oct. 26, 2023

(30) Foreign Application Priority Data

Apr. 21, 2022 (JP) ................................. 2022-070159

(51) Int. Cl.

*G10K 11/172* (2006.01)
*G10K 11/04* (2006.01)
*G10K 11/162* (2006.01)

(52) U.S. Cl.

CPC .......... *G10K 11/172* (2013.01); *G10K 11/162* (2013.01); *G10K 11/04* (2013.01)

(58) Field of Classification Search

CPC ..... G10K 11/162; G10K 11/172; G10K 11/04
See application file for complete search history.

(56) References Cited

U.S. PATENT DOCUMENTS 5,521,341 A * 5/1996 Stief .................... G10K 11/172
181/295
9,270,253 B2 * 2/2016 Chang ...................... H03H 9/25
(Continued)

FOREIGN PATENT DOCUMENTS

JP 2003-36084 A 2/2003
JP 2006-308679 A 11/2006
(Continued)

OTHER PUBLICATIONS

Akira Sanada et al., "A new Helmholtz-based Resonator Effective Over a Wide Frequency Band using a Flexible Panel," Trans. of the Japan Society of Mechanical Engineers (Part C), vol. 71, No. 705, pp. 1513-1520, and translation, 16 pages (2005).

*Primary Examiner* — Forrest M Phillips
(74) *Attorney, Agent, or Firm* — Finnegan, Henderson, Farabow, Garrett & Dunner, LLP

(57) ABSTRACT

According to one embodiment, a sound absorption device includes: a first plate having a plurality of first holes; a second plate facing the first plate in a first direction; a first frame connecting the first plate and the second plate; and a third plate supported by the first frame so as to vibrate in the first direction within the first frame. A first space is formed in the first frame between the first plate and the third plate. A second space is formed in the first frame between the second plate and the third plate. The third plate includes a first portion and a second portion, the second portion having a higher vibration speed than the first portion.

20 Claims, 21 Drawing Sheets

(56) References Cited

U.S. PATENT DOCUMENTS

| | | | | |
|---|---|---|---|---|
| 10,854,183 | B2 | 12/2020 | Yamazoe et al. | |
| 10,923,094 | B2 * | 2/2021 | Hakuta | G10K 11/172 |
| 10,923,095 | B2 | 2/2021 | Hakuta et al. | |
| 11,168,474 | B2 | 11/2021 | Koga et al. | |
| 2020/0143784 | A1 * | 5/2020 | Huang | G10K 11/04 |
| 2021/0039361 | A1 | 2/2021 | Koshitouge et al. | |

FOREIGN PATENT DOCUMENTS

| | | | |
|---|---|---|---|
| JP | 2010-97145 | A | 4/2010 |
| JP | 5056385 | B2 | 10/2012 |
| JP | 5326486 | B2 | 10/2013 |
| JP | 5872155 | B2 | 3/2016 |
| JP | 6450003 | B2 | 1/2019 |
| JP | 6510653 | B2 | 5/2019 |
| JP | 6570641 | B2 | 9/2019 |
| JP | 6610684 | B2 | 11/2019 |
| JP | 6852835 | B2 | 3/2021 |
| JP | 6932252 | B2 | 9/2021 |

* cited by examiner

SOUND ABSORPTION DEVICE

CROSS-REFERENCE TO RELATED APPLICATIONS

This application is based upon and claims the benefit of priority from Japanese Patent Application No. 2022-070159, filed Apr. 21, 2022, the entire contents of which are incorporated herein by reference.

FIELD

Embodiments described herein relate generally to a sound absorption device.

BACKGROUND

As a sound absorption device having a function of reducing noise, a Helmholtz resonator is known. The Helmholtz resonator has a container shape in which an internal space is connected to an external space via one sound hole. The Helmholtz resonator generates resonance in the internal space due to a sound incident via the sound hole, thereby making it possible to attenuate the vibration energy of the incident sound at a resonance frequency. The Helmholtz resonator functions, for example, as a one-degree-of-freedom system. The Helmholtz resonator of the one-degree-of-freedom system has unimodal sound absorption characteristics.

From the viewpoint of changing the sound absorption characteristics to have a wider band, a Helmholtz resonator of a two-degree-of-freedom system has been proposed. The Helmholtz resonator of the two-degree-of-freedom system is realized by separating the internal space into two spaces with an inserted elastic plate. The Helmholtz resonator of the two-degree-of-freedom system has sound absorption characteristics such that a sound absorption coefficient has two separated peaks.

If the loss coefficient of the elastic plate inserted into the Helmholtz resonator of the two-degree-of-freedom system is low, the sound absorption coefficient in the band between the two peaks of the sound absorption coefficient may be significantly reduced. In order to suppress such a reduction in the sound absorption coefficient in the band between the two peaks, a method that attaches a damping material to the elastic plate has been proposed.

DETAILED DESCRIPTION

Figure 1:
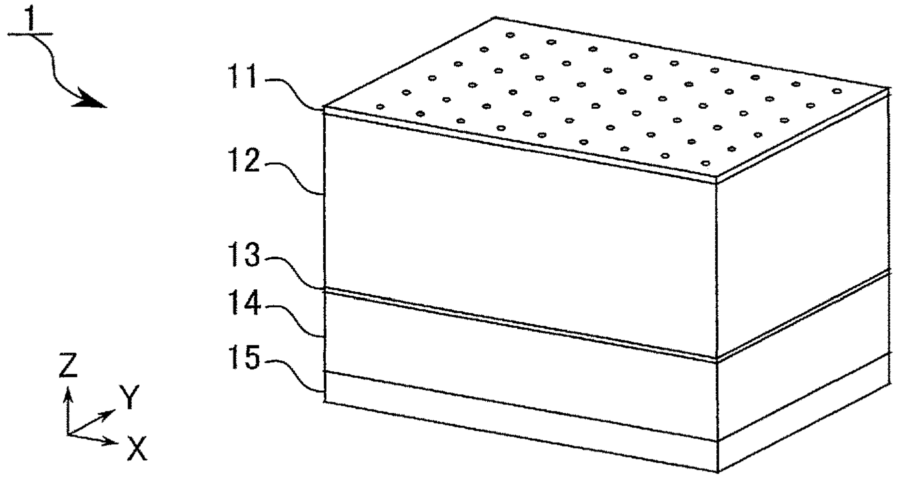
FIG. 1 is a perspective view illustrating an example of an overall configuration of a sound absorption device according to a first embodiment.

In general, according to one embodiment, a sound absorption device includes: a first plate having a plurality of first holes; a second plate facing the first plate in a first direction; a first frame connecting the first plate and the second plate; and a third plate supported by the first frame so as to vibrate in the first direction within the first frame. A first space is formed in the first frame between the first plate and the third plate. A second space is formed in the first frame between the second plate and the third plate. The third plate includes a first portion and a second portion, the second portion having a higher vibration speed than the first portion.

Hereinafter, some embodiments will be described with reference to the drawings. Dimensions and ratios of the drawings are not necessarily the same as actual ones.

In the following explanation, components having basically the same functions and structures will be referred to by the same reference symbols. When elements having similar configurations are particularly distinguished from each other, different characters or numbers may be added to the end of the same reference numeral.

1. First Embodiment

1.1 Configuration

1.1.1 Overall Configuration

Figure 2:
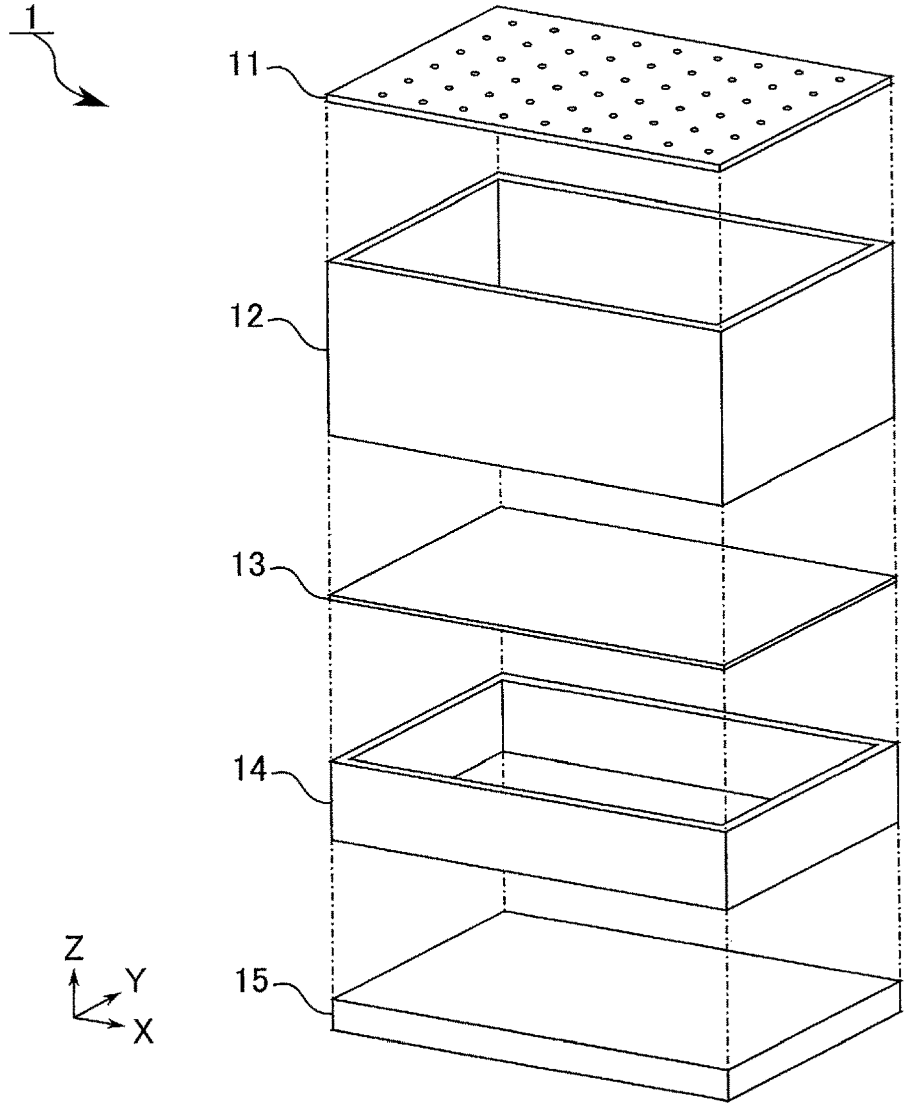
FIG. 2 is an exploded view illustrating an example of the overall configuration of the sound absorption device according to the first embodiment.
Figure 3:
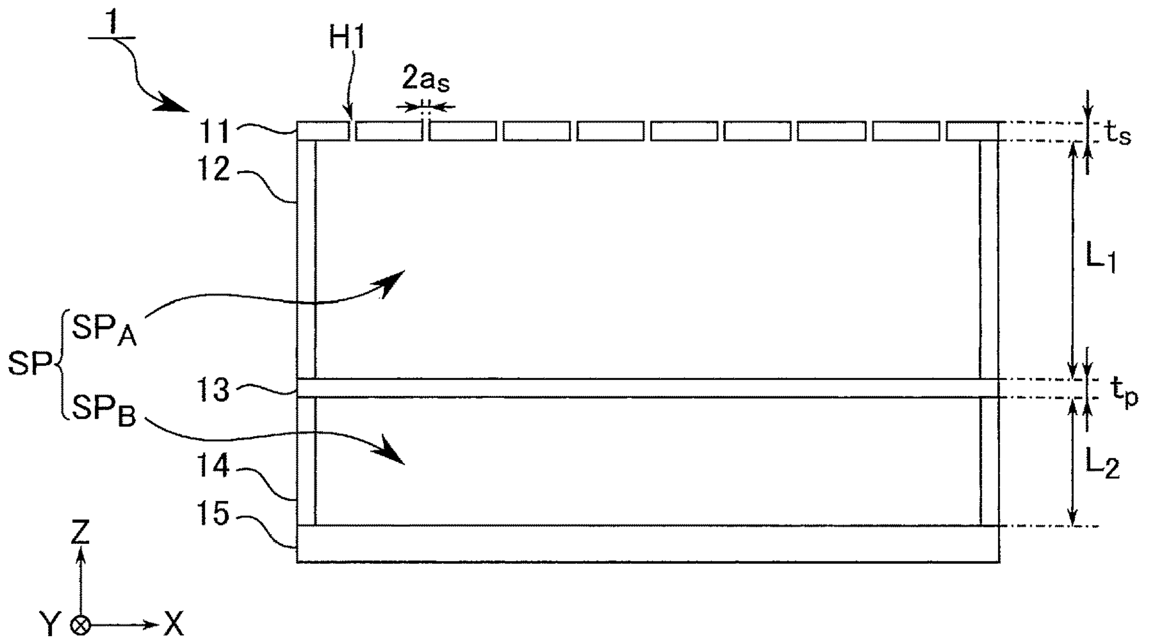
FIG. 3 is a cross-sectional view illustrating an example of a cross-sectional structure of the sound absorption device according to the first embodiment.

FIG. 1 is a perspective view illustrating an example of an overall configuration of a sound absorption device 1 according to a first embodiment. FIG. 2 is an exploded view illustrating an example of the overall configuration of the sound absorption device 1 according to the first embodiment. FIG. 3 is a cross-sectional view illustrating an example of a cross-sectional structure of the sound absorption device 1 according to the first embodiment.

The sound absorption device 1 is a container having a function of absorbing at least a part of sound generated in an external space of the sound absorption device 1 using a principle of a Helmholtz resonator. The sound absorption device 1 includes a sound hole surface plate 11, a frame 12, an elastic plate 13, a frame 14, and a back plate 15. The sound hole surface plate 11, the elastic plate 13, and the back plate 15 are, for example, rectangular flat plates. The frames 12 and 14 are, for example, members having a rectangular tubular shape. The sound absorption device 1 forms an internal space SP partitioned from the external space of the sound absorption device 1. The internal space SP of the sound absorption device 1 has internal spaces SPA and SPB.

Specifically, the sound hole surface plate 11 has a thickness $t_s$. A plurality of holes H1 each having a radius as are formed on the sound hole surface plate 11. The thickness $t_s$ may be translated as a depth of the hole H1. The sound hole surface plate 11 is connected to the frame 12 so as to cover a first opening end of the frame 12. The elastic plate 13 has a thickness tp. The upper surface of the elastic plate 13 is connected to the frame 12 so as to cover a second opening end of the frame 12. As a result, the sound hole surface plate 11 and the elastic plate 13 are provided so as to face each other across the frame 12 with a length L1 therebetween. The sound hole surface plate 11, the frame 12, and the elastic plate 13 form the internal space SPA. The internal space SPA is connected to the external space of the sound absorption device 1 via the plurality of holes H1. The plurality of holes H1 function as paths (sound holes) through which a sound generated in the external space of the sound absorption device 1 enters the internal space SPA of the sound absorption device 1.

The lower surface of the elastic plate 13 is connected to the frame 14 so as to cover a second opening end of the frame 14. The back plate 15 is connected to the frame 14 so as to cover a second opening end of the frame 14. Thus, the elastic plate 13 and the back plate 15 are provided so as to face each other across the frame 14 with a length L2 therebetween. The elastic plate 13, the frame 14, and the back plate 15 form the internal space SPB. The internal space SPB is separated from the internal space SPA and the external space of the sound absorption device 1.

The elastic plate 13 is supported, for example, when the end is sandwiched between the frames 12 and 14. The elastic plate 13 has low rigidity compared to the sound hole surface plate 11, the frames 12 and 14, and the back plate 15. The elastic plate 13 can significantly vibrate due to a sound incident from the plurality of holes H1.

Hereinafter, the long side direction of the elastic plate 13 is referred to as an X direction for convenience of description. A short side direction of the elastic plate 13 is referred to as a Y direction. A vibration direction of the elastic plate 13 is referred to as a Z direction.

1.1.2 Arrangement of Sound Holes

Figure 4:
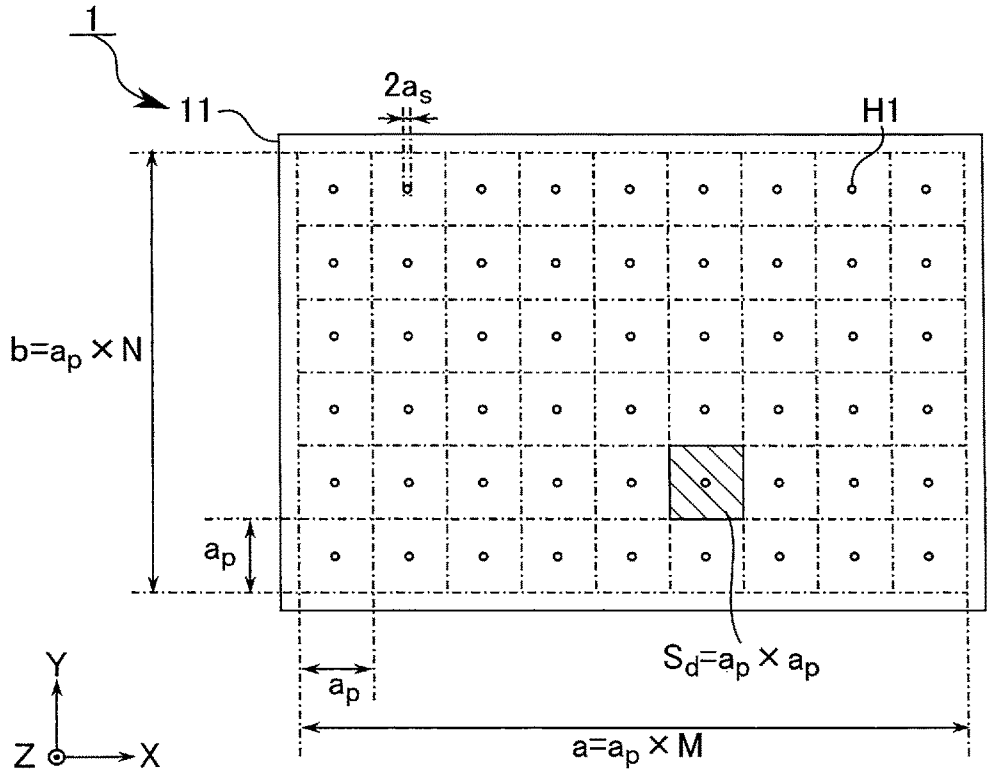
FIG. 4 is a plan view illustrating an example of a planar layout of a plurality of sound holes of the sound absorption device according to the first embodiment.
Figure 5:
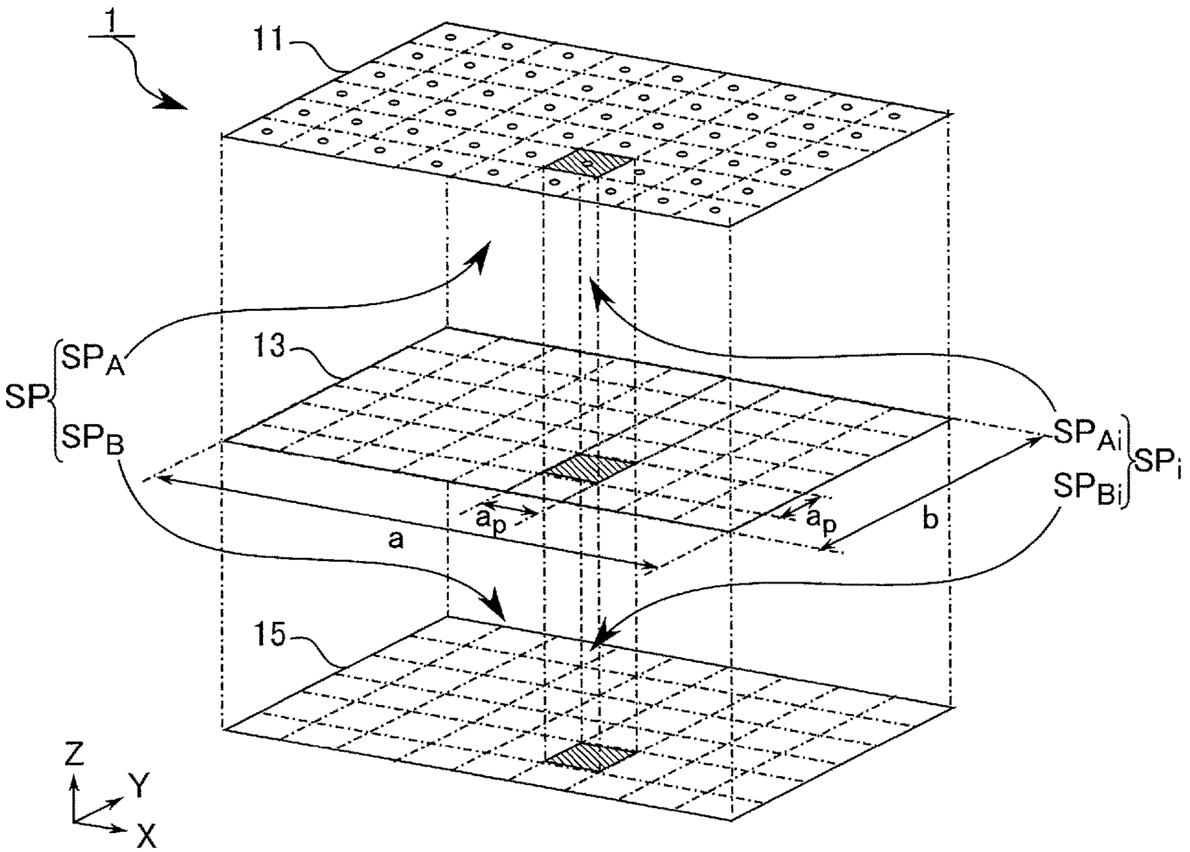
FIG. 5 is a view illustrating an example of an internal space of the sound absorption device according to the first embodiment.

FIG. 4 is a plan view illustrating an example of a planar layout of the plurality of sound holes of the sound absorption device 1 according to the first embodiment. FIG. 5 is a view illustrating an example of the internal space of the sound absorption device 1 according to the first embodiment.

An effective dimension portion of the sound hole surface plate 11 that does not overlap the frame 12 when viewed in the Z direction has a rectangular shape with a length a in the X direction and a length b in the Y direction. The plurality of holes H1 are arranged, for example, in a matrix of M rows×N columns such that distances between adjacent holes H1 are substantially equal in the effective dimension portion. In this case, the effective dimension portion is divided into M×N squares each having one hole H1 arranged at its center. A length $a_p$ of one side of each of the M×N squares is equal to each other. FIG. 4 illustrates a case where M=9 and N=6 as an example.

Hereinafter, the internal space SP of the sound absorption device 1 is virtually divided into M×N partial spaces $SP_i$ ($1 \le i \le M \times N$). Each partial space $SP_i$ is a columnar space having a bottom surface with a diameter of a length $a_p$ when viewed in the Z direction. Here, the diameter of the partial space $SP_i$ when viewed in the Z direction indicates the longest width when the partial space $SP_i$ is viewed in the Z direction. In the example of FIG. 4, each partial space $SP_i$ is a prismatic space having a square with a side length $a_p$ as a bottom surface. Each partial space $SP_i$ has a partial space $SP_{Ai}$ above the elastic plate 13 and a partial space $SP_{Bi}$ below the elastic plate 13. In the sound absorption device 1, one set of one hole H1, partial spaces $SP_{Ai}$ and $SP_{Bi}$ corresponding to the hole H1, and a portion of the elastic plate 13 sandwiched between the partial spaces $SP_{Ai}$ and $SP_{Bi}$ can function as one virtual Helmholtz resonator.

1.2 Design Method

Next, a method for designing the sound absorption device 1 according to the first embodiment will be described. The sound absorption device 1 is designed based on, for example, a guideline including the following two or three steps.

(Step 1: Determination of $a_s$, $t_s$, $L_1$, $a_p$, and p)

First, the radius $a_s$ of the hole H1, the depth is of the hole H1, the length $L_1$, the diameter $a_p$ of the partial space $SP_i$, and the aperture ratio p are determined such that a resonance frequency $f_{helm}$ illustrated in the following formula (1) is equal to a frequency $f_0$ subject to sound absorption while satisfying the dimensional constraints. The frequency $f_0$ subject to sound absorption is defined $a_s$, for example, a median value expressed by $f_0=(f_1+f_2)/2$ when a desired sound absorption frequency band is a band from a frequency $f_1$ to a frequency $f_2$. The aperture ratio p is a ratio of the area of the hole H1 to the area of the partial space $SP_i$ viewed in the Z direction.

$$f_{helm}=c/2\pi\sqrt{p/L_1 t_s'} \tag{1}$$

c is the speed of sound. $t_s'$ is the depth of the corrected hole H1 and $t_s'=t_s+\delta$. δ is the value of opening end correction.

Specifically, the radius $a_s$, the depth $t_s$, and the diameter $a_p$ are fixed to the median values in dimensional constraints of each, while the length $L_1$ is set as an adjustment parameter. If the length $L_1$ exceeds the dimensional constraint due to the low frequency $f_0$ subject to sound absorption, the length $L_1$ is adjusted to satisfy the dimensional constraint by any of the following three methods.

- Reduce the radius $a_s$ within a range of the dimensional constraint
- Increase the depth $t_s$ within a range of the dimensional constraint
- Increase the diameter $a_p$ within a range of the dimensional constraint (Step 2: Determination of Material and Dimension of Elastic Plate 13, and $L_2$)

Next, the material and dimension of the elastic plate 13, and the length L2 are determined such that the resonance frequency $f_{helm}$ substantially coincides with a resonance frequency $f_{plate}$ of the elastic plate 13 in consideration of the internal space SPB expressed by the following formula (2).

$$f_{plate}=\sqrt{(K_p+\rho c^2\gamma/L_2)/M_p}/2\pi \tag{2}$$

ρ is the density of the air. $K_p$ is the equivalent stiffness of the elastic plate 13. $M_p$ is the modal mass of the elastic plate 13. γ is the parameter related to sound pressure of the lower surface of the elastic plate 13. Sound pressure of the lower surface of the elastic plate 13 can be considered constant regardless of the partial space $SP_i$, except in a case where the length L2 is too short.

Basically, the design of the sound absorption device 1 is completed in the designs up to STEP 1 and STEP 2. In a case where it is desired to further improve the sound absorption characteristics, for example, when the sound absorption characteristics obtained in the designs up to STEP 1 and STEP 2 are low, the following STEP 3 may be further performed under the condition with a constant aperture ratio p.

(Step 3: Adjustment of $L_1$)

First, with the length $L_1$ determined in STEP 1, the depth $t_s$ at which the peak of the sound absorption coefficient is high is selected within a range of the dimensional constraint.

Subsequently, with the selected $t_s$, the length $L_1$ is adjusted within a range of the dimensional constraint such that the resonance frequency $f_{helm}$ is equal to the frequency $f_0$ subject to sound absorption.

Thus, the design of the sound absorption device 1 is completed.

Note that the above guideline is merely an example, and the sound absorption device 1 may be designed based on any guidelines. In addition, the sound absorption device 1 may be designed by trial and error.

1.3 Simulation

Next, a simulation related to the sound absorption characteristics of the sound absorption device 1 according to the first embodiment will be described.

1.3.1 Definitions of Various Amounts

Hereinafter, a simulation of a sound absorption coefficient α of the sound absorption device 1 performed under three conditions (A), (B), and (C) will be described.

The sound absorption coefficient α is a ratio of the energy of a sound absorbed by the sound absorption device 1 to the energy of a sound incident on the sound absorption device 1. The sound absorption coefficient α is expressed by the following formula (3) using a characteristic impedance $Z_a=Z_r+jz_{im}$ of the sound absorption device 1.

$$\alpha=4\rho c z_r/((z_r+\rho c)^2+z_{im}^2) \tag{3}$$

$z_r$ and $z_{im}$ are a real part and an imaginary part of the characteristic impedance $Z_a$, respectively. j is a complex symbol, and $j=\sqrt{(-1)}$. The characteristic impedance $Z_a$ corresponding to the partial space $SP_i$ is expressed $a_s$ $Z_{ai}$.

As illustrated in the formula (3), the sound absorption coefficient α can be calculated, for example, $a_s$ a combination of a plurality of partial sound absorption coefficients ai corresponding to a plurality of partial spaces $SP_i$.

Figure 6:
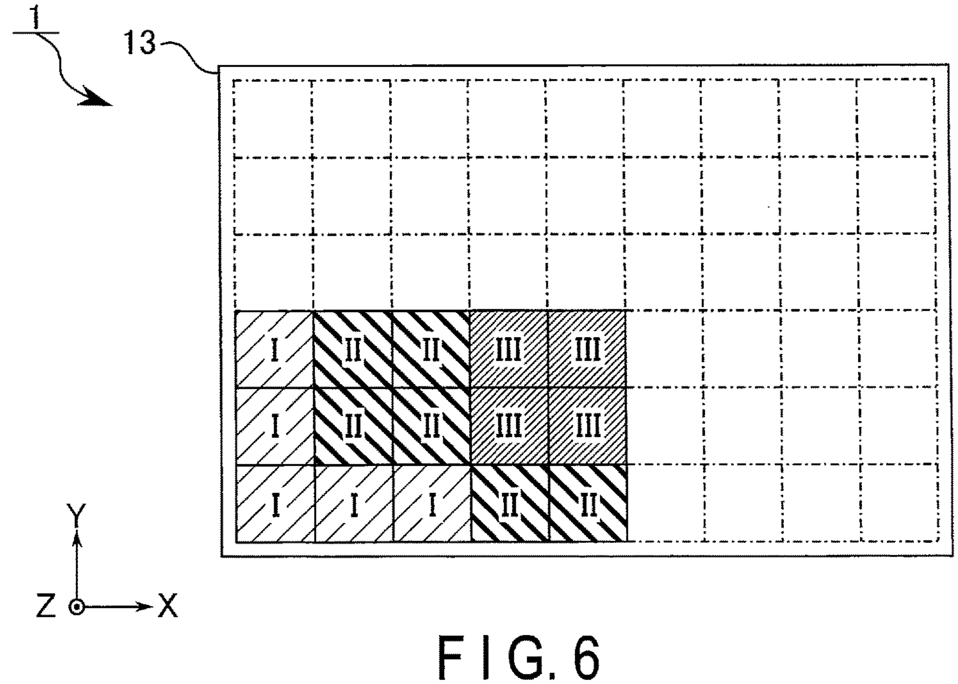
FIG. 6 is a view illustrating an example of classification of a partial sound absorption coefficient in a simulation of the sound absorption device according to the first embodiment.

FIG. 6 is a view illustrating an example of classification of a partial sound absorption coefficient in the simulation of the sound absorption device 1 according to the first embodiment. As illustrated in FIG. 6, in the simulation, the partial sound absorption coefficient $\alpha_i$ is classified into three cases I, II, and III according to the height of the vibration speed of a portion of the elastic plate 13 corresponding to the partial space $SP_i$. Hereinafter, for convenience of description, a case of a primary vibration mode will be assumed $a_s$ an example.

A partial sound absorption coefficient $\alpha_i$ calculated so $a_s$ to correspond to a portion of the elastic plate 13 having a relatively low vibration speed is classified $a_s$ the case I. A partial sound absorption coefficient $\alpha_i$ calculated so $a_s$ to correspond to a portion of the elastic plate 13 having a relatively high vibration speed is classified $a_s$ the case III. A partial sound absorption coefficient $\alpha_i$ calculated so $a_s$ to correspond to a portion of the elastic plate 13 where the vibration speed is between the vibration speed in the case I and the vibration speed in the case III is classified as the case II.

In the example of FIG. 6, since the vibration speed is the lowest in a corner region of the rectangular elastic plate 13, the corner region is classified as the case I. Since the vibration speed is the highest in a region near the center of the rectangular elastic plate 13, the region near the center is classified as the case III. A region between the region classified as Case I and the region classified as Case III is classified as Case II.

In the calculation of the sound absorption coefficient α and the partial sound absorption coefficient $\alpha_i$ as described above, various amounts are defined as follows.

R is an air viscosity resistance of the sound hole. ω is an angular frequency of the sound.

$D_0$ is a bending stiffness of the elastic plate 13. $\rho_p$ is a density of the elastic plate 13. η is a loss coefficient of the elastic plate 13. The bending stiffness $D_0$, $\rho_p$, and η are determined by the material of the elastic plate 13.

$S_h$ is an area of the hole H1, and $S_h=\pi a_s^2$. $S_a$ is an area of a portion corresponding to the internal space SP of the elastic plate 13, and $S_a$=ab. $S_d$ is an area of a portion corresponding to the partial space $SP_i$ of the elastic plate 13, and $S_d=a_p^2$. The area $S_d$ corresponding to the partial space $SP_i$ is expressed $a_s$ Si.

$p_2$ is a division rate, and $p_2=S_d/S_a$. $K_h$ is a spring coefficient of air corresponding to the internal space $SP_A$, and $K_b=\rho c^2/L_1$.

1.3.2 Condition (A)

First, the condition (A) will be described. In the condition (A), sound pressures on the upper surface and the lower surface of the elastic plate 13 and the vibration speed of the elastic plate 13 are considered to be constant (as an average sound pressure and average vibration speed) regardless of the corresponding partial space $SP_i$.

Specifically, a characteristic impedance $Z_a$ of the sound absorption device 1 in the condition (A) is expressed by the following formulae (4), (5), and (6).

$$Z_a = \frac{1}{p} Z_1 \tag{4}$$

$$Z_1 = j\omega\rho t_s' + \frac{R}{S_h} + \frac{S_h}{S_d} \times \frac{(Z_2 + j\rho(\omega L_1))}{(1 + j\omega Z_2 / K_h)} \tag{5}$$

$$Z_2 = \frac{S_a}{Q}\left(\frac{1}{j\omega}\left(K_P + \rho c^2 / L_2 \times \frac{Q}{S_a}\right) + j\omega M_P + K_P\eta / \omega\right) \tag{6}$$

Here, Q, $M_p$, and $K_p$ are expressed $a_s$ the following formulae (7), (8), and (9), respectively, using a vibration mode function $\Phi_1$ of the elastic plate 13.

$$Q = \left(\int_{S_a} \Phi_1 ds\right)^2 \tag{7}$$

$$M_p = \int_{S_a} \rho_p t_p \Phi_1^2 ds \tag{8}$$

$$K_p = \int_{S_a} D_0 \Phi_1 \frac{\partial^4 \Phi_1}{\partial r^4} ds \tag{9}$$

1.3.3 Condition (B)

Next, the condition (B) will be described. In the condition (B), the sound pressure on the upper surface of the elastic plate 13 is considered to be constant regardless of the corresponding partial space $SP_i$. In the condition (B), a difference in the vibration speed of the elastic plate 13 according to the corresponding partial space $SP_i$ is considered. The condition (B) is further divided into a case where the sound pressure on the lower surface of the elastic plate 13 is considered to be constant regardless of the partial space $SP_i$ and a case where a difference in the sound pressure on the lower surface of the elastic plate 13 corresponding to the partial space $SP_i$ is considered.

Specifically, a characteristic impedance $Z_a$ of the sound absorption device 1 in the condition (B) is expressed by the following formulae (10), (11), and (12).

$$1/Z_a = \sum_i p_2 / Z_{ai},\ Z_{ai} = 1/pZ_{1i} \tag{10}$$

$$Z_{1i} = j\omega\rho t_S' + \frac{R}{S_h} + \frac{S_h}{S_d} \times \frac{(Z_{2i} + j\rho(\omega L_1))}{(1 + j\omega Z_{2i} / K_h)} \tag{11}$$

$$Z_{2i} = \frac{S_d}{\sqrt{QQ_i}}\left(\frac{1}{j\omega}\left(K_P + \frac{\rho c^2 \gamma}{L_2}\right) + j\omega M_P + K_P\eta / \omega\right) \tag{12}$$

Here, Qi is expressed by the following formula (13) using the vibration mode function $\Phi_1$ of the elastic plate 13.

$$Q_i = \left(\int_{s_i} \Phi_1 ds\right)^2 \tag{13}$$

When the sound pressure on the lower surface of the elastic plate 13 is considered to be constant regardless of the partial space $SP_i$, a parameter γ is expressed by the following formula (14).

$$\gamma = Q/S_a \tag{14}$$

When a difference in the sound pressure on the lower surface of the elastic plate 13 corresponding to the partial space $SP_i$ is considered, a parameter γ is expressed by the following formula (15).

$$\gamma = \Sigma_i (Q_i / S_i) \tag{15}$$

The parameter γ affects a natural frequency of the elastic plate 13 that considers the air in the internal space SPB. However, it can be considered that the parameter γ does not give a significant difference to comparison results of the conditions (A) to (C). Therefore, in the condition (B), the parameter γ based on the formula (14) is used.

1.3.4 Condition (C)

Next, the condition (C) will be described. In the condition (C), differences in the sound pressure on the upper surface of the elastic plate 13 and the vibration speed of the elastic plate 13 according to the corresponding partial space $SP_i$ are considered. As in the condition (B), the condition (C) is further divided into a case where the sound pressure on the lower surface of the elastic plate 13 is considered to be constant regardless of the partial space $SP_i$ and a case where a difference in the sound pressure on the lower surface of the elastic plate 13 corresponding to the partial space $SP_i$ is considered. It is assumed that the sound pressure on the upper surface of the elastic plate 13 in the condition (C) is not affected by the interference between the partial spaces $SP_{Ai}$.

Specifically, a characteristic impedance $Z_a$ of the sound absorption device 1 in the condition (C) is expressed by the following formulae (16), (17), and (18).

$$1/Z_a = \sum_i p_2 / Z_{ai},\ Z_{ai} = 1/pZ_{1i} \tag{16}$$

$$Z_{1i} = j\omega\rho t_S' + \frac{R}{S_h} + \frac{S_h}{S_d} \times \frac{(Z_{2i} + j\rho(\omega L_1))}{(1 + j\omega Z_{2i} / K_h)} \tag{17}$$

-continued $$Z_{2i} = \frac{p_2 S_d}{Q_i}\left\{\frac{1}{j\omega}\left(K_p + \frac{\rho c^2 \gamma}{L_2}\right) + j\omega M_P + K_P\eta/\omega\right\} \quad (18)$$

Division into cases regarding the sound pressure on the lower surface of the elastic plate 13 according to the parameter γ in the condition (C) is the same $a_s$ that in the condition (B). As in the condition (B), the parameter γ based on the formula (14) is used in the condition (C).

1.3.5 Simulation Results

Simulation results based on the above-described conditions (A) to (C) will be described.

Figure 7:
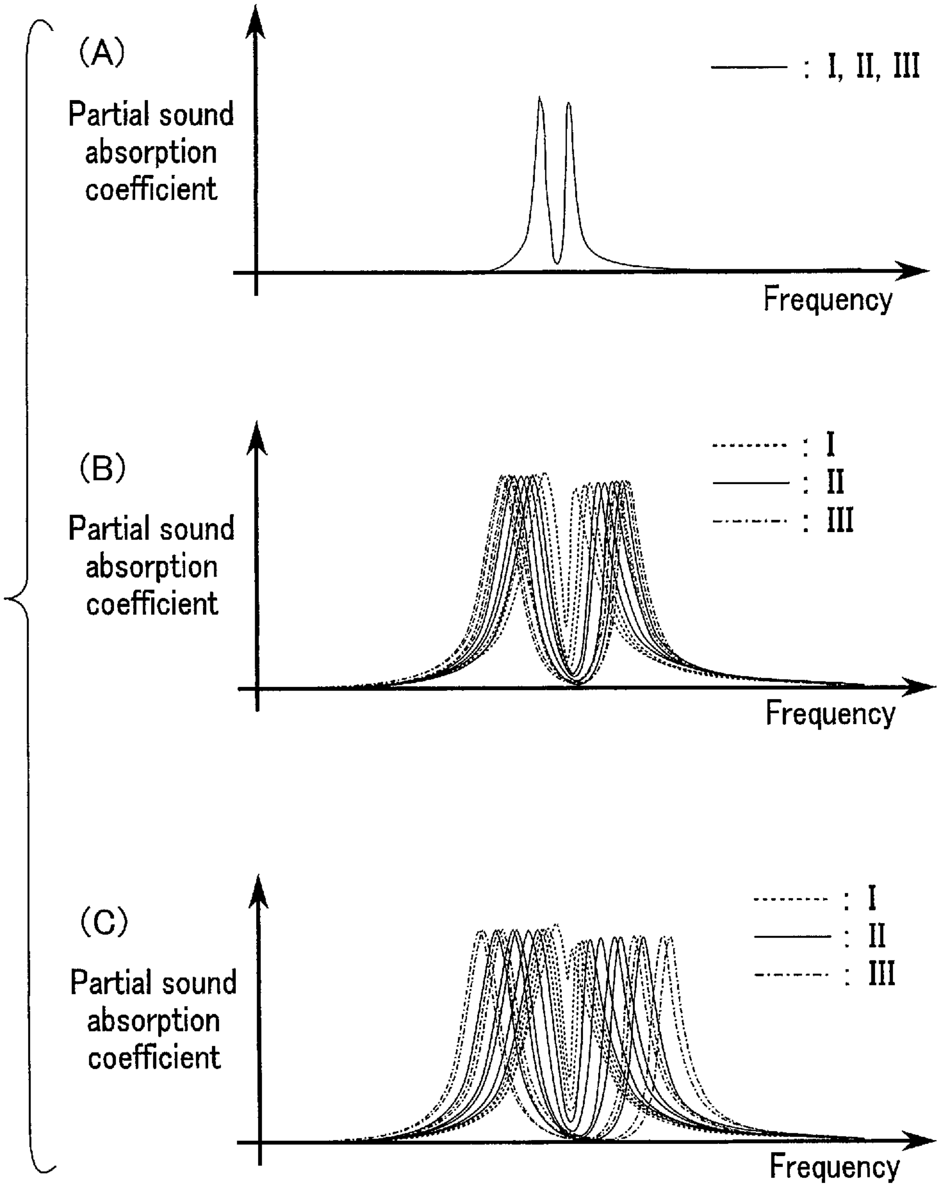
FIG. 7 is a diagram illustrating calculation results of the partial sound absorption coefficient in the simulation of the sound absorption device according to the first embodiment.

FIG. 7 is a diagram illustrating calculation results of the partial sound absorption coefficient in the simulation of the sound absorption device 1 according to the first embodiment. In FIG. 7, a plurality of partial sound absorption coefficients $\alpha_i$ calculated $a_s$ a function of the frequency of the sound are illustrated for each of the cases I, II, and III. FIG. 7 includes portions (A), (B), and (C). Portions (A), (B), and (C) of FIG. 7 correspond to the simulation results in the conditions (A), (B), and (C), respectively.

First, simulation results in the condition (A) will be described with reference to a portion (A) of FIG. 7.

In the condition (A), the history regarding a frequency of the partial sound absorption coefficient $\alpha_i$ does not change regardless of the cases I to III. Thus, in the condition (A), the frequency corresponding to two peaks of the partial sound absorption coefficient $\alpha_i$ does not change regardless of the cases I to III. In addition, a drop amount (dip) of the sound absorption coefficient between the two peaks of the partial sound absorption coefficients $\alpha_i$ does not change regardless of the cases I to III.

Subsequently, simulation results in the condition (B) will be described with reference to a portion (B) of FIG. 7.

In the condition (B), a frequency corresponding to the peak on a low frequency side of the two peaks of the partial sound absorption coefficient $\alpha_i$ shifts to the low frequency side in the order of the cases I, II, and III. A frequency corresponding to the peak on a high frequency side of the two peaks of the partial sound absorption coefficient $\alpha_i$ shifts to the high frequency side in the order of the cases I, II, and III. In addition, the dip between the two peaks of the partial sound absorption coefficient $\alpha_i$ decreases in the order of the cases III, II, and I.

Subsequently, simulation results in the condition (C) will be described with reference to a portion (C) of FIG. 7.

The tendency of the partial sound absorption coefficient $\alpha_i$ in the condition (C) is similar to the tendency of the partial sound absorption coefficient $\alpha_i$ in the condition (B). However, in the condition (C), the shift amount of the frequency corresponding to the peak between the cases is larger than that in the condition (B). In addition, in the condition (C), the dip between the peaks is smaller than that in the condition (B).

Figure 8:
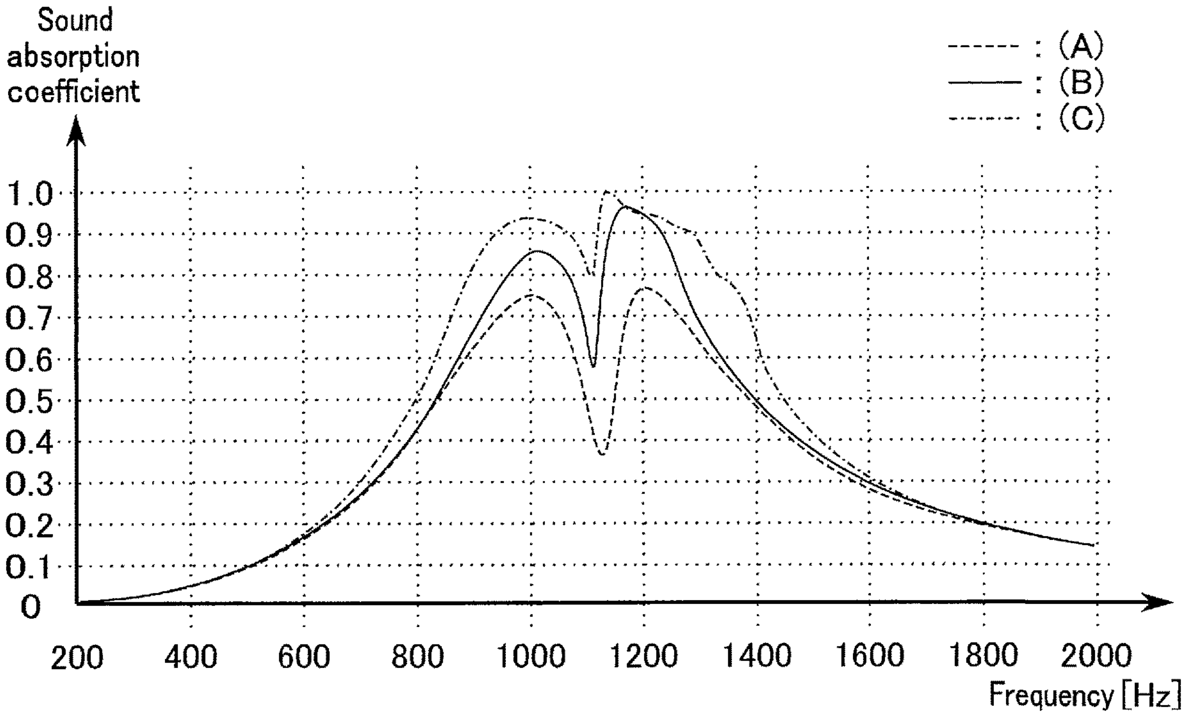
FIG. 8 is a diagram illustrating calculation results of a sound absorption coefficient in the simulation of the sound absorption device according to the first embodiment.

FIG. 8 is a diagram illustrating calculation results of a sound absorption coefficient in the simulation of the sound absorption device 1 according to the first embodiment. In FIG. 8, the sound absorption coefficient α $a_s$ the sum of the plurality of partial sound absorption coefficients $\alpha_i$ is illustrated for each of the conditions (A), (B), and (C).

As illustrated in FIG. 8, the frequency band that can be considered to have a high sound absorption coefficient is widened in the order of the conditions (A), (B), and (C). In addition, the dip between the peaks decreases in the order of the conditions (A), (B), and (C).

1.4 Effects According to First Embodiment

According to the first embodiment, the sound hole surface plate 11 has the plurality of holes H1. One elastic plate 13 supported by the frames 12 and 14 so $a_s$ to vibrate in the Z direction is provided for the plurality of holes H1. With this configuration, the sound absorption device 1 can be regarded $a_s$ a combination of a plurality of virtual Helmholtz resonators formed by a set of the partial space $SP_i$, the portion of the elastic plate 13 corresponding to the partial space $SP_i$, and one hole H1. Thus, it is possible to alleviate constraints related to the thickness or Young's modulus of the elastic plate 13 as compared with a case where one elastic plate is provided for one Helmholtz resonator. Therefore, it is possible to alleviate a design load when trying to absorb a sound in a low frequency band.

In addition, the virtual Helmholtz resonator corresponding to the portion of the elastic plate 13 having a low vibration speed has sound absorption characteristics close to those of a Helmholtz resonator of a one-degree-of-freedom system. On the other hand, the virtual Helmholtz resonator corresponding to the portion of the elastic plate 13 having a high vibration speed has sound absorption characteristics close to those of a Helmholtz resonator of a two-degree-of-freedom system. For this reason, the sound absorption device 1 has sound absorption characteristics combining the sound absorption characteristics of the Helmholtz resonator of the one-degree-of-freedom system and the sound absorption characteristics of the Helmholtz resonator of the two-degree-of-freedom system. Therefore, it is possible to reduce the dip between the peaks while widening a frequency band with a high sound absorption coefficient without providing a damping material.

To supplement, the condition (A) in the simulation corresponds to a case where the elastic plate 13 vibrates in the Z direction without deformation. On the other hand, the conditions (B) and (C) correspond to a case where the elastic plate 13 vibrates in the Z direction while bending. Thus, the condition (A) is a condition closer to that for one Helmholtz resonator of the two-degree-of-freedom provided with the elastic plate 13 than the conditions (B) and (C). On the other hand, the conditions (B) and (C) are conditions closer to those for the combination of a plurality of Helmholtz resonators of the two-degree-of-freedom system in which one elastic plate is provided for a plurality of sound holes than the condition (A). Therefore, the sound absorption device 1 according to the first embodiment can have sound absorption characteristics between the condition (A) and the condition (B) or sound absorption characteristics between the condition (A) and the condition (C).

The simulation results in the conditions (B) and (C) have a wider frequency band with a high sound absorption coefficient and a smaller dip between the peaks than the simulation results in the condition (A). Therefore, it can be expected that the frequency band with a high sound absorption coefficient is wider and the dip between the peaks is smaller in the sound absorption characteristics of the sound absorption device 1 according to the first embodiment than in the sound absorption characteristics of the Helmholtz resonator of the two-degree-of-freedom in which one elastic plate is provided for one sound hole.

2. Second Embodiment

Next, a sound absorption device according to a second embodiment will be described.

According to the simulation results described above, it can be expected to, $a_s$ the condition is closer to the condition (B) than the condition (A) and is closer to the condition (C) than the condition (B), obtain sound absorption characteristics such that the frequency band with a high sound absorption coefficient is wider and the dip between the peaks is smaller. The second embodiment is different from the first embodiment in that an internal space $SP_1$ is physically partitioned into each partial space $SP_i$. Hereinafter, a configuration different from that of the first embodiment will be mainly described. Description of configurations equivalent to those of the first embodiment will be omitted $a_s$ appropriate.

2.1 Overall Configuration

Figure 9:
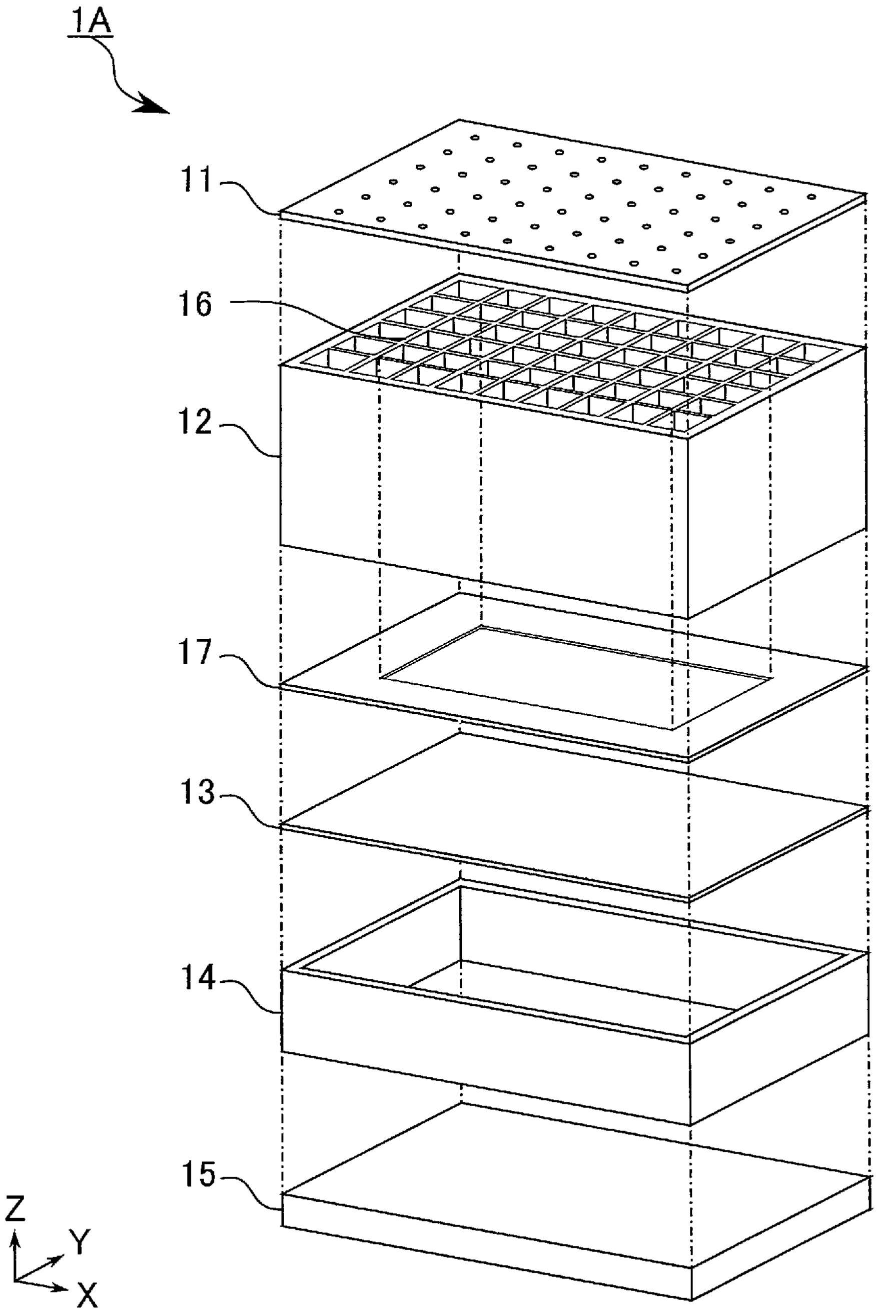
FIG. 9 is an exploded view illustrating an example of an overall configuration of a sound absorption device according to a second embodiment.
Figure 10:
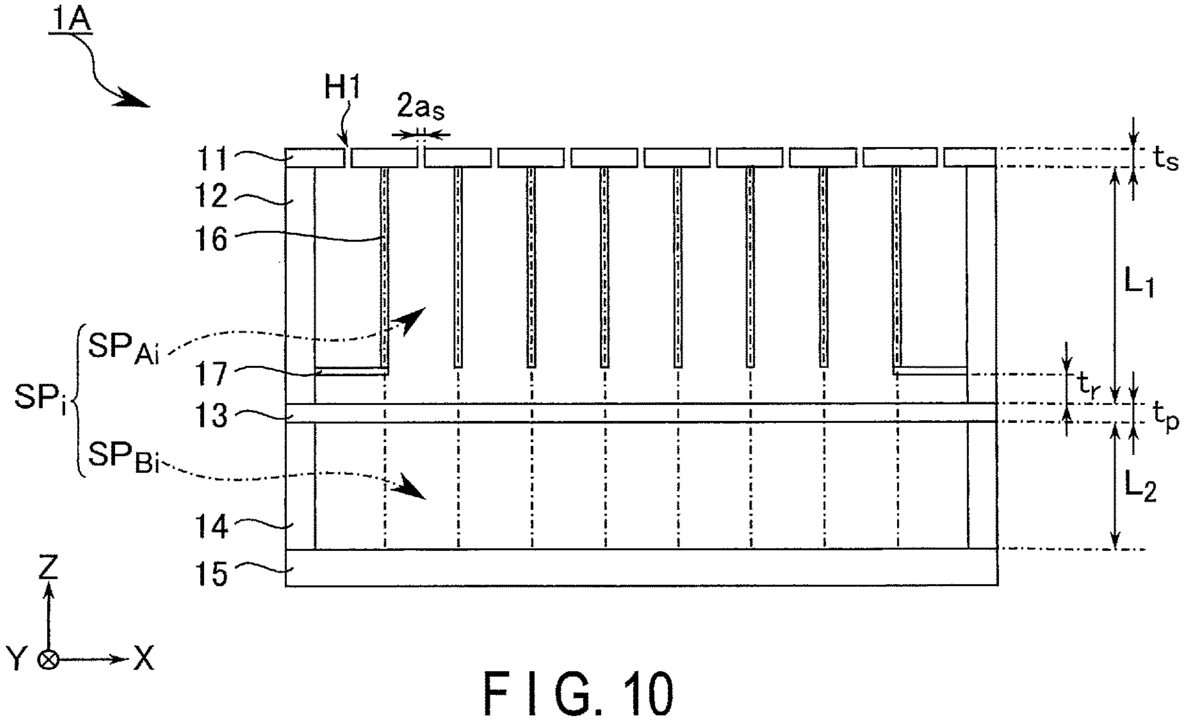
FIG. 10 is a cross-sectional view illustrating an example of a cross-sectional structure of the sound absorption device according to the second embodiment.

FIG. 9 is an exploded view illustrating an example of an overall configuration of a sound absorption device 1A according to the second embodiment. FIG. 10 is a cross-sectional view illustrating an example of a cross-sectional structure of the sound absorption device 1A according to the second embodiment. FIGS. 9 and 10 correspond to FIGS. 2 and 3 in the first embodiment, respectively. The sound absorption device 1A includes a slit 16 and a lid 17, in addition to a sound hole surface plate 11, a frame 12, an elastic plate 13, a frame 14, and a back plate 15.

The slit 16 is a member that extends in the Z direction and partitions the internal space $SP_A$ into each partial space $SP_{Ai}$. The slit 16 is connected to the frame 12. The upper end of the slit 16 is in contact with the sound hole surface plate 11. The lower end of the slit 16 is not in contact with the elastic plate 13.

The lid 17 is a plate having significantly higher rigidity than the elastic plate 13. That is, the lid 17 can be regarded $a_s$ a rigid plate that does not vibrate due to a sound that vibrates the elastic plate 13. The lid 17 covers the lower end of the slit 16 so $a_s$ to separate a partial space $SP_{Ai}$ corresponding to a portion of the elastic plate 13 having a low vibration speed among a plurality of partial spaces $SP_{Ai}$ partitioned by the slit 16 into a sound hole surface plate 11 side and an elastic plate 13 side. As a result, the space on the sound hole surface plate 11 side separated by the lid 17 of the partial space $SP_{Ai}$ corresponding to the portion of the elastic plate 13 having a low vibration speed is separated from the other space of the internal space $SP_A$ by the slit 16 and the lid 17.

A clearance having a length of $t_r$ is formed between the lid 17 and the elastic plate 13. The length $t_r$ is preferably shorter within a range in which the elastic plate 13 and the lid 17 are not in contact with each other due to the vibration of the elastic plate 13. The length $t_r$ can be designed to be, for example, about one millimeter.

2.2 Arrangement of Sound Hole, Slit, and Lid

Figure 11:
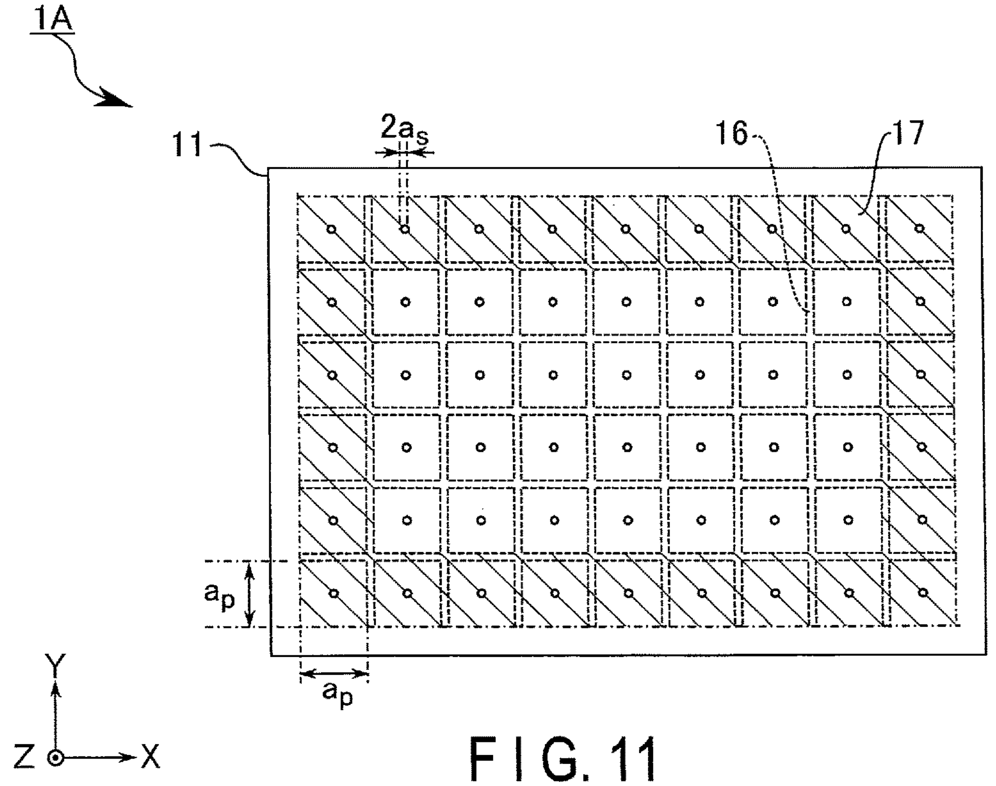
FIG. 11 is a plan view illustrating an example of a planar layout of a plurality of sound holes, a slit, and a lid of the sound absorption device according to the second embodiment.

FIG. 11 is a plan view illustrating an example of a planar layout of a plurality of sound holes, the slit, and the lid of the sound absorption device 1A according to the second embodiment. FIG. 11 corresponds to FIG. 4 in the first embodiment. In FIG. 11, the slit 16 is indicated by dotted lines and a region corresponding to the lid 17 is hatched.

The slit 16 partitions the effective dimension portion of the sound hole surface plate 11, when viewed in the Z direction, such that M×N square regions having the same area are aligned in a matrix. Each of a plurality of holes H1 is arranged at the center of the M×N square regions partitioned by the slit 16. The lid 17 has a shape obtained by hollowing out inner (M−2)×(N−2) square regions among the M×N squares when viewed in the Z direction. That is, in the example of FIG. 11, a partial space $SP_i$ with the lid 17 is arranged so $a_s$ to surround a partial space $SP_i$ without the lid 17.

2.3 Simulation

Next, a simulation related to the sound absorption characteristics of the sound absorption device 1A according to the second embodiment will be described.

2.3.1 Condition (D)

In the condition (D), the presence or absence of the slit 16 and the lid 17 is further considered in the condition (B).

Specifically, in the partial space $SP_i$ without the lid 17, the same characteristic impedance as in the formulas (10) to (12) in the condition (B) is applied.

Then, a space generated between the lid 17 and the elastic plate 13 can be further considered. In this case, a length $L_1$ may be corrected to a length $L_1'$ as illustrated in the following formula (19) when a characteristic impedance $Z_{1i}$ is calculated.

$$L_1' = L_1 + N_h t_r, N_h = N_q / N_p \quad (19)$$

Here, Np is the number of partial spaces $SP_i$ that function as a Helmholtz resonator of a two-degree-of-freedom system. Nq is the number of partial spaces $SP_i$ that function as a Helmholtz resonator of a one-degree-of-freedom system.

On the other hand, in the partial space $SP_i$ with the lid 17, the same characteristic impedance as in the formulas (10) and (11) in the condition (B) is applied. A characteristic impedance $Z_{2i}$ is ∞ when the lid 17 is regarded as a rigid plate.

Then, a space generated between the lid 17 and the elastic plate 13 can be further considered. In this case, the length $L_1$ may be corrected to the length $L_1'$ $a_s$ illustrated in the following formula (20) when the characteristic impedance $Z_{1i}$ is calculated.

$$L_1'' = L_1 - t_b \quad (20)$$

The length $t_b$ is a sum of the thickness of the lid 17 and the length $t_r$ of the clearance between the lid 17 and the elastic plate 13.

2.3.2 Simulation Results

Simulation results based on the above-described condition (D) will be described.

Figure 12:
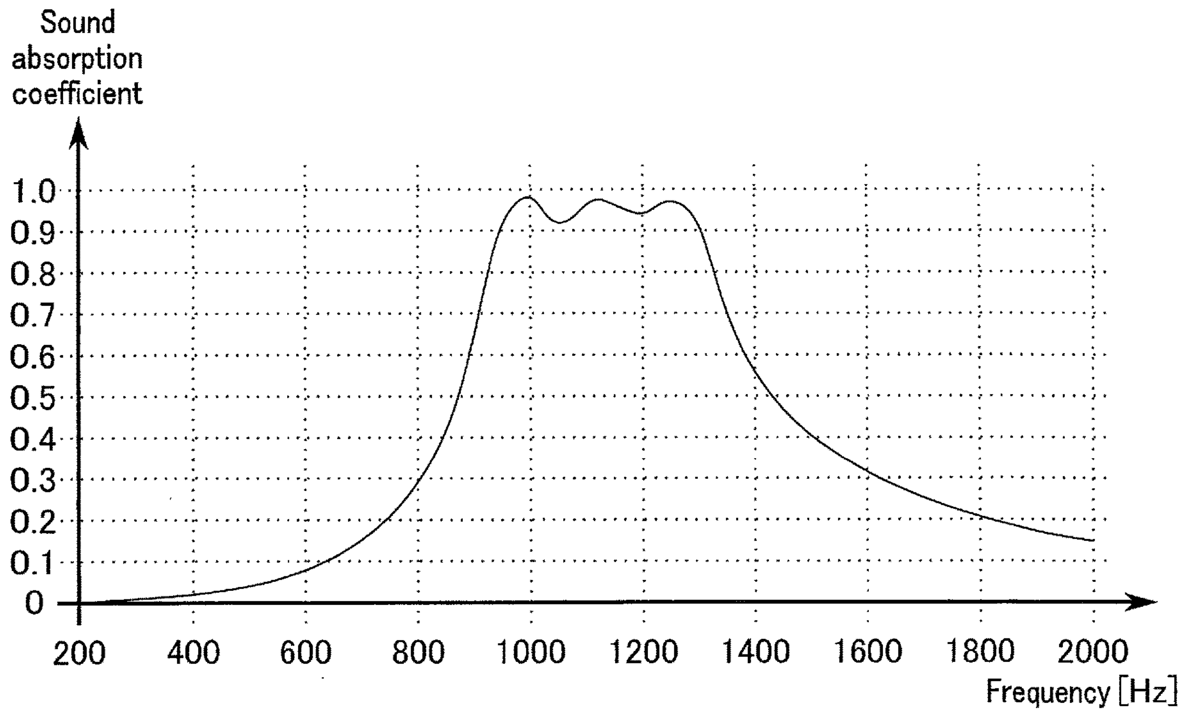
FIG. 12 is a diagram illustrating calculation results of a sound absorption coefficient in a simulation of the sound absorption device according to the second embodiment.

FIG. 12 is a diagram illustrating calculation results of a sound absorption coefficient in the simulation of the sound absorption device 1A according to the second embodiment. FIG. 12 corresponds to FIG. 8 in the first embodiment.

As illustrated in FIG. 12, it can be confirmed that the dip between the peaks is suppressed because the design of the sound absorption device 1A is closer to the condition (C). Note that since a decrease amount in the dip between the peaks and a bandwidth at which the sound absorption coefficient is high are in a trade-off relation, it is desirable to appropriately set the ratio of Np and Nq so as to satisfy both requirements.

2.4 Measurement Results

Figure 13:
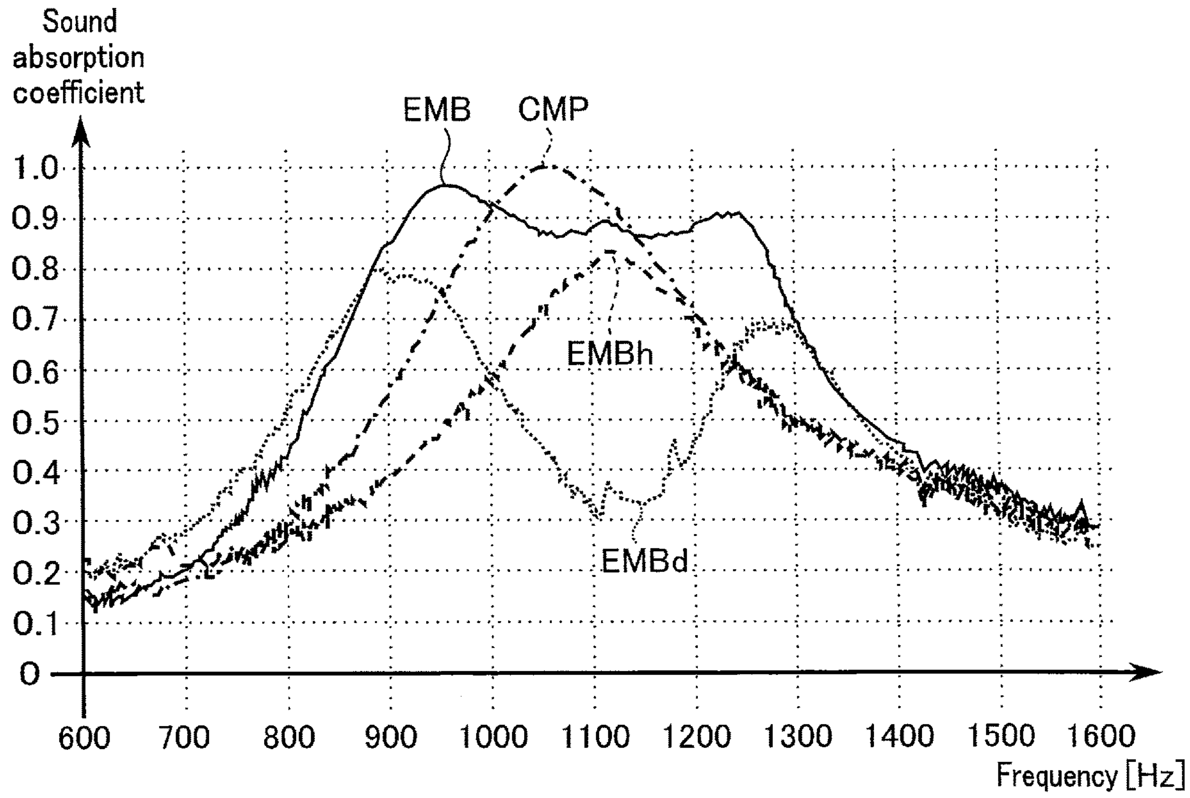
FIG. 13 is a diagram illustrating measurement results of a sound absorption coefficient in an implementation example of the sound absorption device according to the second embodiment.

FIG. 13 is a diagram illustrating measurement results of a sound absorption coefficient in an implementation example of the sound absorption device according to the second embodiment. In FIG. 13, measurement results of the sound absorption coefficient of a sound absorption device 1C (Illustrated in FIGS. 17, 18, and 19) in which a first modification described later is applied to the second embodiment are indicated by a solid line EMB. Measurement results of the sound absorption coefficient when the elastic plate 13 of the sound absorption device is changed to a rigid plate are indicated by a chain line CMP. In addition, measurement results of the sound absorption coefficient of a portion of the sound absorption device 1C corresponding to the partial space $SP_i$ without the lid 17 are indicated by a dotted line EMBd. Furthermore, measurement results of the sound absorption coefficient of a portion of the sound absorption device 1C corresponding to the partial space $SP_i$ with the lid 17 are indicated by a broken line EMBh.

As illustrated in FIG. 13, the broken line EMBh well reproduces unimodal sound absorption characteristics of the Helmholtz resonator of the one-degree-of-freedom system. The dotted line EMBd well reproduces the sound absorption characteristics of the Helmholtz resonator of the two-degree-of-freedom system exhibiting two peaks and a dip.

It can be understood that the solid line EMB indicates sound absorption characteristics combining the sound absorption characteristics of the broken line EMBh and the sound absorption characteristics of the dotted line EMBd. As a result, it can be confirmed that the solid line EMB widens the band at which the sound absorption coefficient is high while reducing the dip, as compared with the chain line CMP. In addition, the solid line EMB well matches the simulation results illustrated in FIG. 12.

2.5 Effects According to Second Embodiment

According to the second embodiment, the slit 16 extends in the Z direction and partitions the internal space $SP_A$ into each partial space $SP_{Ai}$. As a result, interference between the partial spaces $SP_{Ai}$ can be reduced. Thus, the sound absorption characteristics of the sound absorption device 1A can be brought close to the condition (D) close to the simulation condition (C). Therefore, it is possible to widen the frequency band at which the sound absorption coefficient is high and reduce the dip between the peaks.

In addition, the lid 17 separates the partial space $SP_{Ai}$ corresponding to the portion of the elastic plate 13 having a low vibration speed among the plurality of partial spaces $SP_{Ai}$ partitioned by the slit 16 into the sound hole surface plate 11 side and the elastic plate 13 side. As a result, in the partial space $SP_{Ai}$ corresponding to the portion of the elastic plate 13 having a low vibration speed, a sound incident from a corresponding hole H1 is blocked by the lid 17 having higher rigidity than the elastic plate 13. Therefore, the sound absorption characteristics of the partial space $SP_i$ corresponding to the portion of the elastic plate 13 having a low vibration speed can be brought closer to the sound absorption characteristics of the Helmholtz resonator of the one-degree-of-freedom system than in a case where the lid 17 is not provided. As described above, the sound absorption characteristics of the Helmholtz resonator of the one-degree-of-freedom system are unimodal. Therefore, the dip between the peaks can be further reduced.

In addition, a clearance is formed between the lid 17 and the elastic plate 13 to such an extent that the vibration of the elastic plate 13 is not hindered. As a result, it is possible to avoid impairing the sound absorption characteristics $a_s$ the Helmholtz resonator of the two-degree-of-freedom system in the sound absorption device TA.

3. Third Embodiment

Next, a sound absorption device according to a third embodiment will be described.

The third embodiment is different from the first embodiment and the second embodiment in that the internal space $SP_A$ is partitioned such that a sound wave reflected by an elastic plate 13 is selectively incident on the corresponding partial space $SP_i$. Hereinafter, a configuration different from that of the second embodiment will be mainly described. Description of configurations equivalent to those of the second embodiment will be omitted $a_s$ appropriate.

3.1 Overall Configuration

Figure 14:
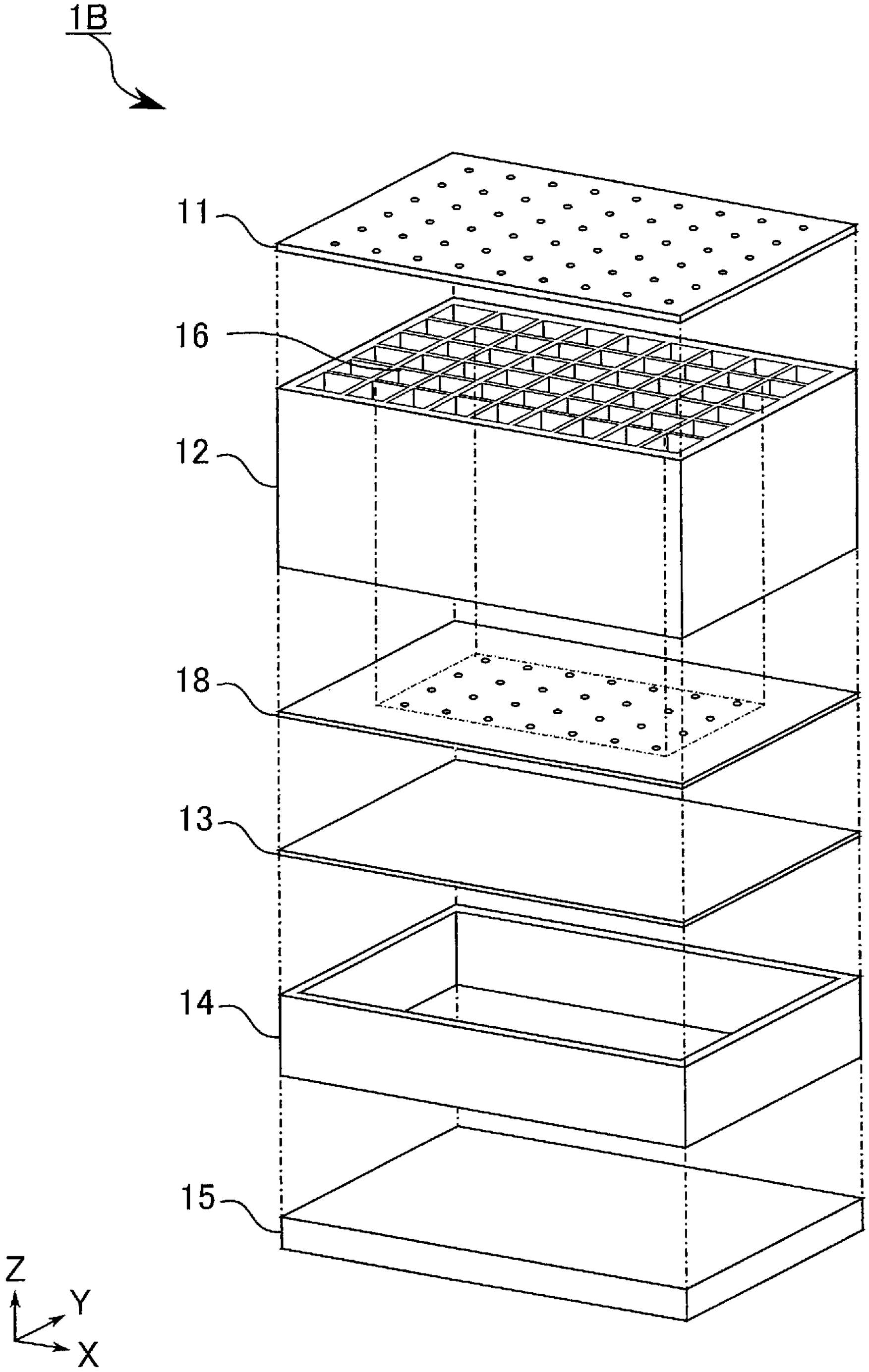
FIG. 14 is an exploded view illustrating an example of an overall configuration of a sound absorption device according to a third embodiment.
Figure 15:
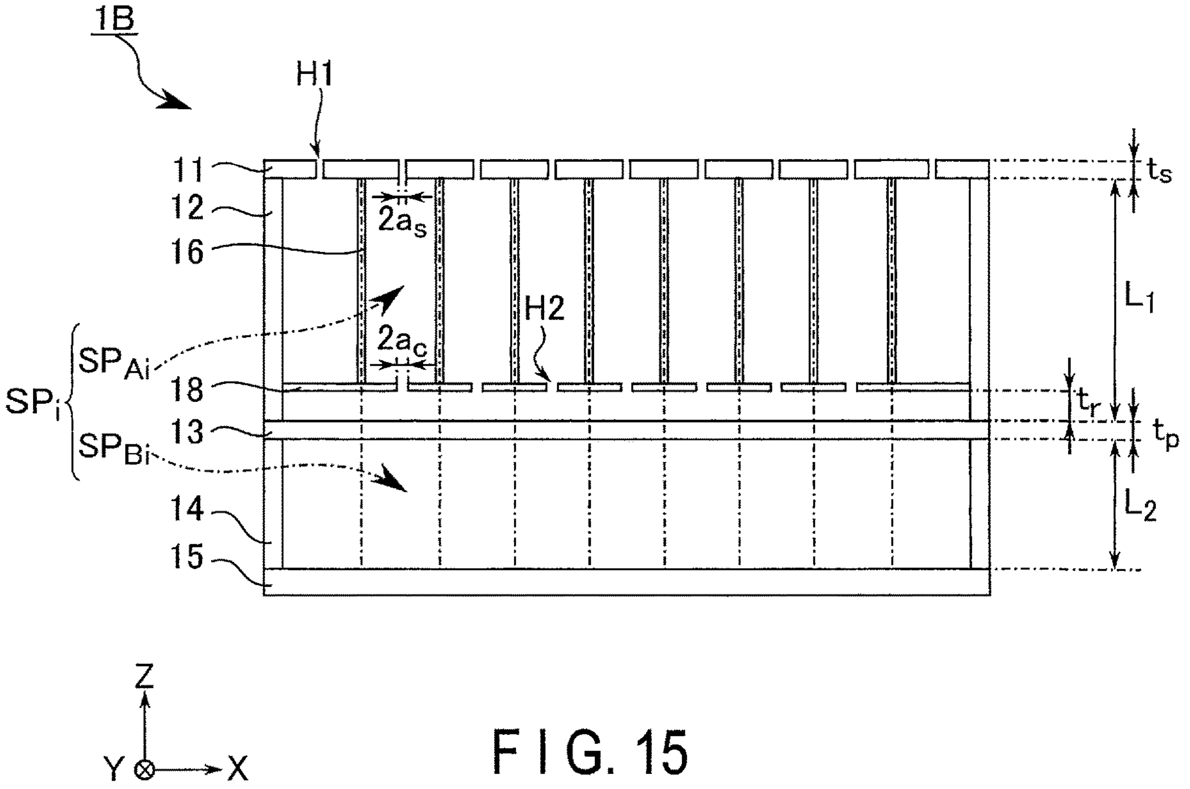
FIG. 15 is a cross-sectional view illustrating an example of a cross-sectional structure of the sound absorption device according to the third embodiment.

FIG. 14 is an exploded view illustrating an example of an overall configuration of a sound absorption device 1B according to the third embodiment. FIG. 15 is a cross-sectional view illustrating an example of a cross-sectional structure of the sound absorption device 1B according to the third embodiment. FIGS. 14 and 15 correspond to FIGS. 9 and 10 in the second embodiment, respectively. The sound absorption device 1B includes a lid 18 instead of the lid 17.

The lid 18 is a plate having significantly higher rigidity than an elastic plate 13. That is, the lid 18 can be regarded as a rigid plate that does not vibrate due to a sound that vibrates the elastic plate 13. A clearance having a length of $t_r$ is formed between the lid 18 and the elastic plate 13. The length $t_r$ is preferably shorter within a range in which the elastic plate 13 and the lid 18 does not interfere with each other due to the vibration of the elastic plate 13. The length $t_r$ can be designed to be, for example, about one millimeter.

The lid 18 covers the lower end of a slit 16 so as to separate a partial space $SP_A$, corresponding to a portion of the elastic plate 13 having a low vibration speed among a plurality of partial spaces $SP_A$, partitioned by the slit 16 into a sound hole surface plate 11 side and an elastic plate 13 side. As a result, the space on the sound hole surface plate 11 side separated by the lid 18 of a partial space $SP_A$, corresponding to the portion of the elastic plate 13 having a low vibration speed is separated from the other space of the internal space $SP_A$ by the slit 16 and the lid 18.

In addition, the lid 18 has a plurality of holes H2 that connect the sound hole surface plate 11 side and the elastic plate 13 side of a partial space $SP_{Ai}$ corresponding to a portion of the elastic plate 13 having a high vibration speed among the plurality of partial spaces $SP_{Ai}$ partitioned by the slit 16. The diameter ($=2a_c$) of the hole H2 is equal to or larger than the diameter ($=2a_s$) of the hole H1 and less than the diameter of the partial space $SP_i$ when viewed in the Z direction. As a result, a space connecting the sound hole surface plate 11 side and the elastic plate 13 side of the partial space $SP_{Ai}$ corresponding to the portion of the elastic plate 13 having a high vibration speed is narrowed by the lid 18.

3.2 Cross-Sectional Structure of Lid

Figure 16:
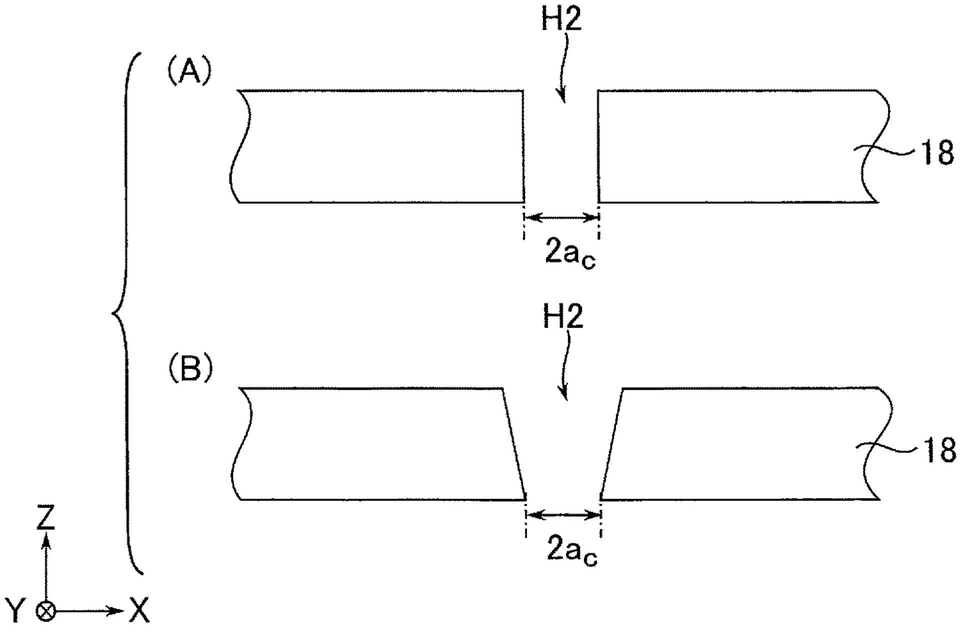
FIG. 16 is a cross-sectional view illustrating an example of a cross-sectional structure of a lid of the sound absorption device according to the third embodiment.

FIG. 16 is a cross-sectional view illustrating an example of a cross-sectional structure of the lid of the sound absorption device 1B according to the third embodiment.

As illustrated in a portion (A) of FIG. 16, the cross-sectional shape of the hole H2 may be a shape in which the diameter on the sound hole surface plate 11 side is substantially equal to the diameter on the elastic plate 13 side. As illustrated in a portion (B) of FIG. 16, the cross-sectional shape of the hole H2 may be a tapered shape in which the diameter decreases from the sound hole surface plate 11 side toward the elastic plate 13 side. When the hole H2 has the tapered shape, the above-described constraints related to the diameter of the hole H2 are imposed on the diameter on the elastic plate 13 side.

3.3 Effects According to Third Embodiment

According to the third embodiment, the lid 18 has the hole H2 that connects the sound hole surface plate 11 side and the elastic plate 13 side of the partial space $SP_{Ai}$ corresponding to the portion of the elastic plate 13 having a high vibration speed. The diameter of the hole H2 is equal to or larger than the diameter of the hole H1 and less than the diameter of the partial space $SP_{Ai}$ when viewed in the Z direction. As a result, a sound wave reflected by a portion of the elastic plate 13 corresponding to a certain partial space $SP_i$ can be suppressed from entering another partial space $SP_i$. Thus, the sound absorption characteristics of the partial space $SP_i$ corresponding to the portion of the elastic plate 13 having a high vibration speed can be brought closer to the sound absorption characteristics of a Helmholtz resonator of a two-degree-of-freedom system than in a case where the lid 18 is not provided. Therefore, it is possible to widen the frequency band at which the sound absorption coefficient is high.

4. Modifications

Note that the sound absorption devices according to the first embodiment, the second embodiment, and the third embodiment are not limited to the above-described examples, and various modifications can be applied.

4.1 First Modification

For example, in the second embodiment and the third embodiment, the case where the internal space $SP_A$ is partitioned by the slit 16 into each partial space $SP_i$ has been described, but the present invention is not limited thereto. Hereinafter, $a_s$ an example, a configuration different from that of the second embodiment will be mainly described assuming a case where a first modification is applied to the second embodiment.

Figure 17:
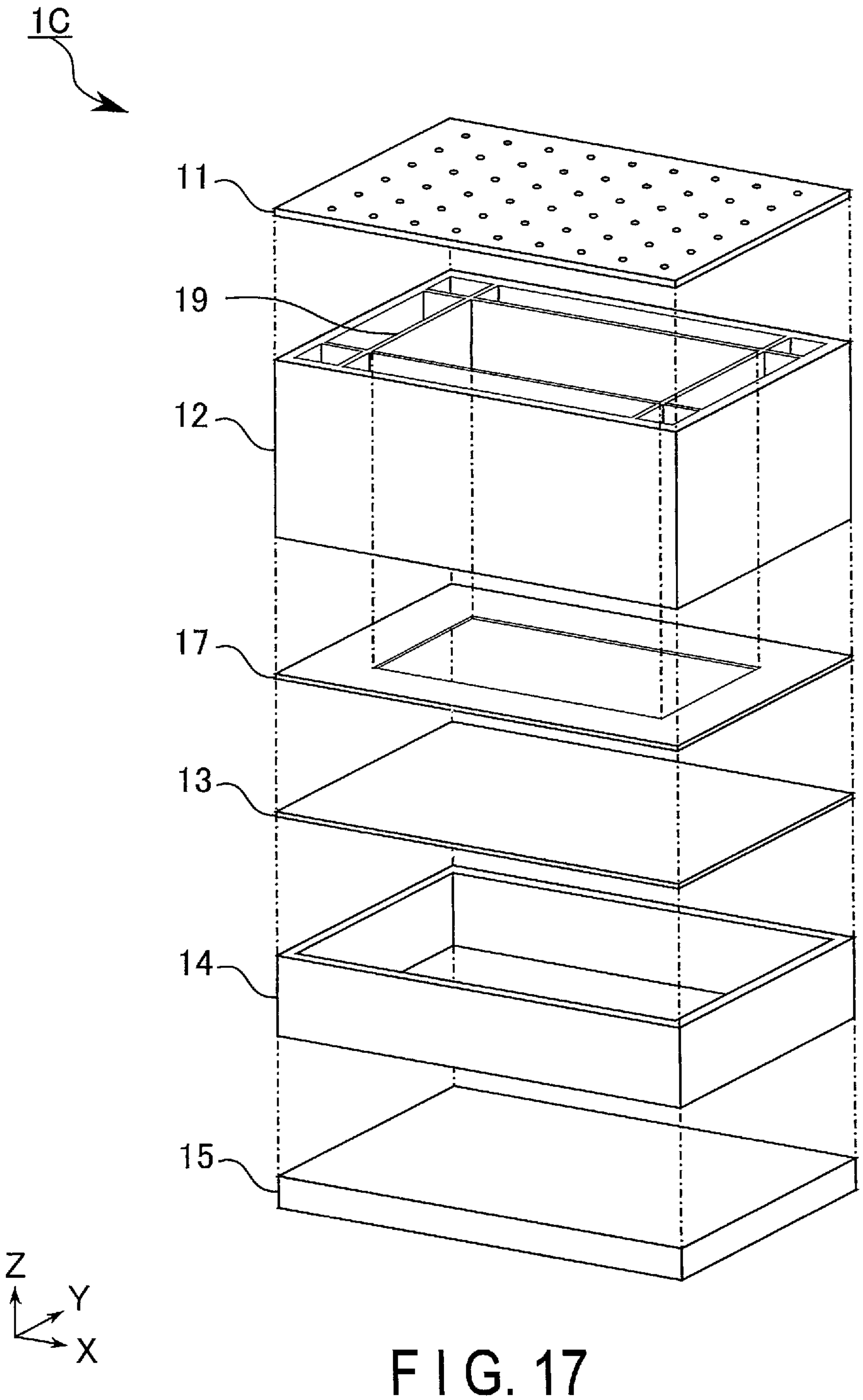
FIG. 17 is an exploded view illustrating an example of an overall configuration of a sound absorption device according to a first modification.
Figure 18:
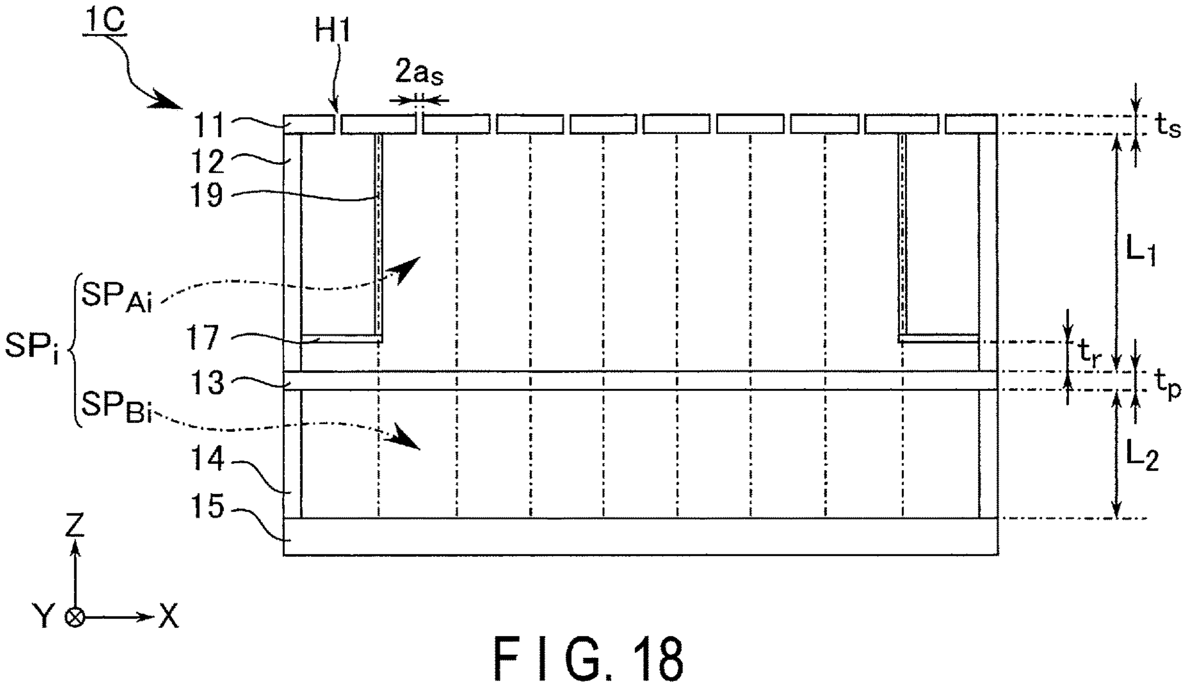
FIG. 18 is a cross-sectional view illustrating an example of a cross-sectional structure of the sound absorption device according to the first modification.

FIG. 17 is an exploded view illustrating an example of an overall configuration of a sound absorption device 1C according to the first modification. FIG. 18 is a cross-sectional view illustrating an example of a cross-sectional structure of the sound absorption device 1C according to the first embodiment. FIGS. 17 and 18 correspond to FIGS. 9 and 10 in the second embodiment, respectively. As illustrated in FIGS. 17 and 18, the sound absorption device 1C may include a slit 19 instead of the slit 16.

The slit 19 extends in the Z direction and partitions an internal space $SP_A$ into a set of partial spaces $SP_i$ corresponding to a portion of an elastic plate 13 having a low vibration speed and a set of partial spaces $SP_i$ corresponding to a portion of the elastic plate 13 having a high vibration speed. The slit 19 is connected to a frame 12. The upper end of the slit 19 is in contact with a sound hole surface plate 11. The lower end of the slit 19 is not in contact with the elastic plate 13. A lid 17 covers the lower end of the slit 19 so $a_s$ to separate a partial space $SP_A$, corresponding to a portion of the elastic plate 13 having a low vibration speed among a plurality of partial spaces $SP_A$, partitioned by the slit 19 into a sound hole surface plate 11 side and an elastic plate 13 side.

Figure 19:
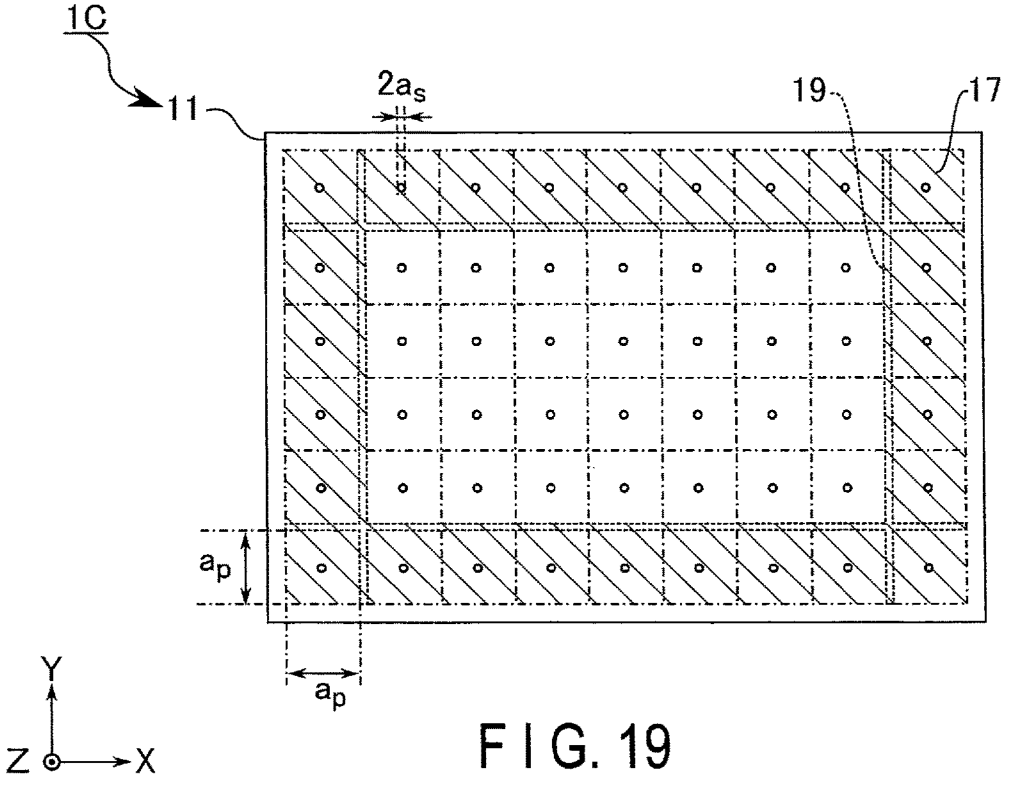
FIG. 19 is a plan view illustrating an example of a planar layout of a plurality of sound holes, a slit, and a lid of the sound absorption device according to the first modification.

FIG. 19 is a plan view illustrating an example of a planar layout of a plurality of sound holes, the slit, and the lid of the sound absorption device 1C according to the first modification. FIG. 19 corresponds to FIG. 11 in the second embodiment. In FIG. 19, the slit 19 is indicated by dotted lines and a region corresponding to the lid 17 is hatched.

The slit 19 partitions an effective dimension portion of the sound hole surface plate 11 into a "#" shape when viewed in the Z direction. As a result, the effective dimension portion is divided into eight peripheral regions corresponding to a portion of the elastic plate 13 having a low vibration speed and one central region corresponding to a portion of the elastic plate 13 having a high vibration speed. Each of the peripheral regions and the central region can be divided into a square region having a side length $a_p$. Each of a plurality of holes H1 is arranged at the center of the corresponding square region. The lid 17 has a shape obtained by hollowing out a portion corresponding to the central region.

According to the first modification, the manufacturing cost of the slit 19 can be reduced. In addition, the slit 19 partitions the internal space into the partial spaces $SP_{Ai}$ corresponding to the portion of the elastic plate 13 having a low vibration speed and the partial spaces $SP_{Ai}$ corresponding to the portion of the elastic plate 13 having a high vibration speed. Therefore, $a_s$ in the second embodiment, it is possible to achieve both widening of the frequency band at which the sound absorption coefficient is high and reduction of the dip between the peaks.

4.2 Second Modification

In addition, for example, in the first embodiment, the second embodiment, and the third embodiment, the case where the internal space SPB is separated from the internal space $SP_A$ by the elastic plate 13 has been described, but the present invention is not limited thereto. Hereinafter, $a_s$ an example, a configuration different from that of the second embodiment will be mainly described assuming a case where a second modification is applied to the second embodiment.

Figure 20:
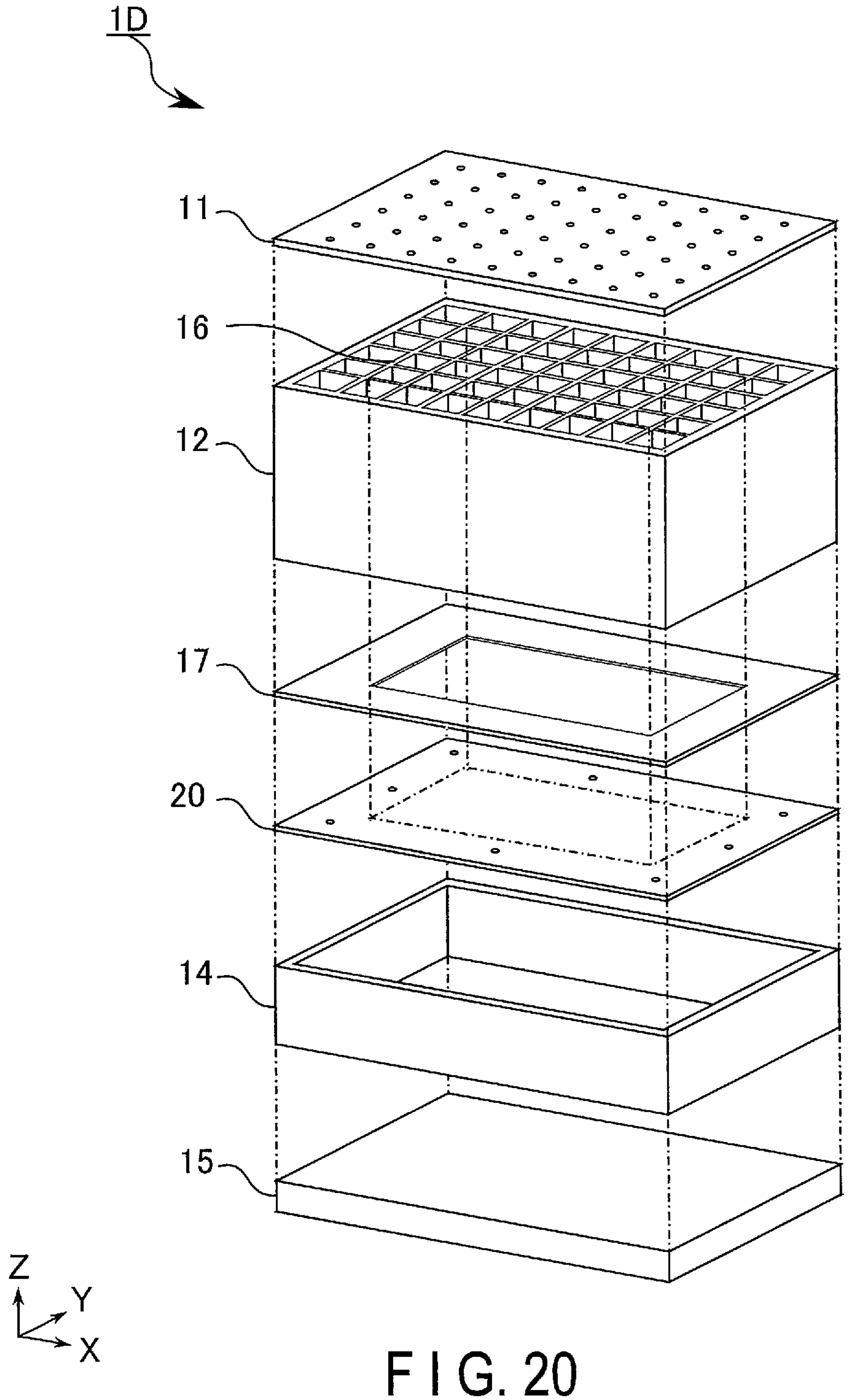
FIG. 20 is an exploded view illustrating an example of an overall configuration of a sound absorption device according to a second modification.
Figure 21:
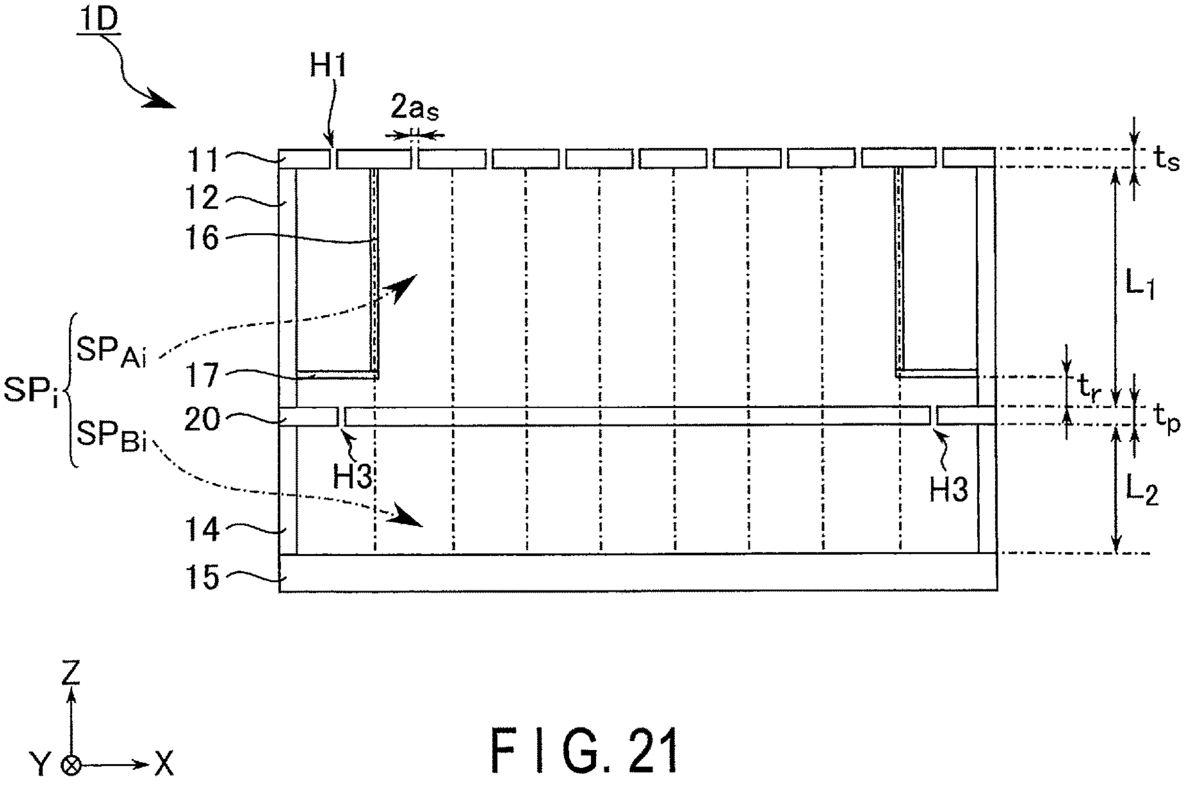
FIG. 21 is a cross-sectional view illustrating an example of a cross-sectional structure of the sound absorption device according to the second modification.

FIG. 20 is an exploded view illustrating an example of an overall configuration of a sound absorption device 1D according to the second modification. FIG. 21 is a cross-sectional view illustrating an example of a cross-sectional structure of the sound absorption device 1D according to the second modification. FIGS. 20 and 21 correspond to FIGS. 9 and 10 in the second embodiment, respectively. As illustrated in FIGS. 20 and 21, the sound absorption device 1D may include an elastic plate 20 instead of the elastic plate 13.

A configuration of the elastic plate 20 is the same as the configuration of the elastic plate 13 except that a plurality of holes H3 are formed. An internal space SPB is connected to an internal space $SP_A$ via the plurality of holes H3. The plurality of holes H3 are formed in the vicinity of the end of the elastic plate 20 supported by the frames 12 and 14 when viewed in the Z direction. The diameter of the hole H3 may be any diameter as long as the hole H3 allows air to flow therethrough, and is preferably minute. Specifically, for example, the diameter of the hole H3 is preferably equal to or smaller than the diameter of the hole H1. In particular, when the second modification is applied to the second embodiment and the third embodiment, it is desirable that the plurality of holes H3 be formed in a portion of the elastic plate 20 corresponding to a partial space $SP_A$, in which a sound hole surface plate 11 side and an elastic plate 20 side are separated by the lid 17 or 18.

According to the second modification, the pressure can be made equal between the internal space $SP_A$ and the internal space SPB. Thus, it is possible to suppress the vibration of the elastic plate 20 from being hindered due to a pressure difference between the internal space $SP_A$ and the internal space SPB. Therefore, it is possible to suppress the reduction of the sound absorption characteristics, for example, even when the pressure in the vicinity of the sound hole surface plate 11 decreases, such as in a case where the sound absorption device 1D is applied to a device that generates a fast air flow, such as an air conditioning duct.

In addition, it is possible to reduce the influence of the hole H3 on the sound absorption characteristics of the sound absorption device 1D by providing the hole H3 in the region corresponding to the partial space $SP_{Ai}$ separated into the space on the sound hole surface plate 11 side and the space on the elastic plate 20 side.

4.3 Third Modification

In addition, for example, in the first embodiment, the second embodiment, and the third embodiment, the case where the device shape is rectangular when viewed in the Z direction has been described, but the present invention is not limited thereto. Hereinafter, as an example, a configuration different from that of the first modification of the second embodiment will be mainly described assuming a case where a third modification is applied to the first modification of the second embodiment.

Figure 22:
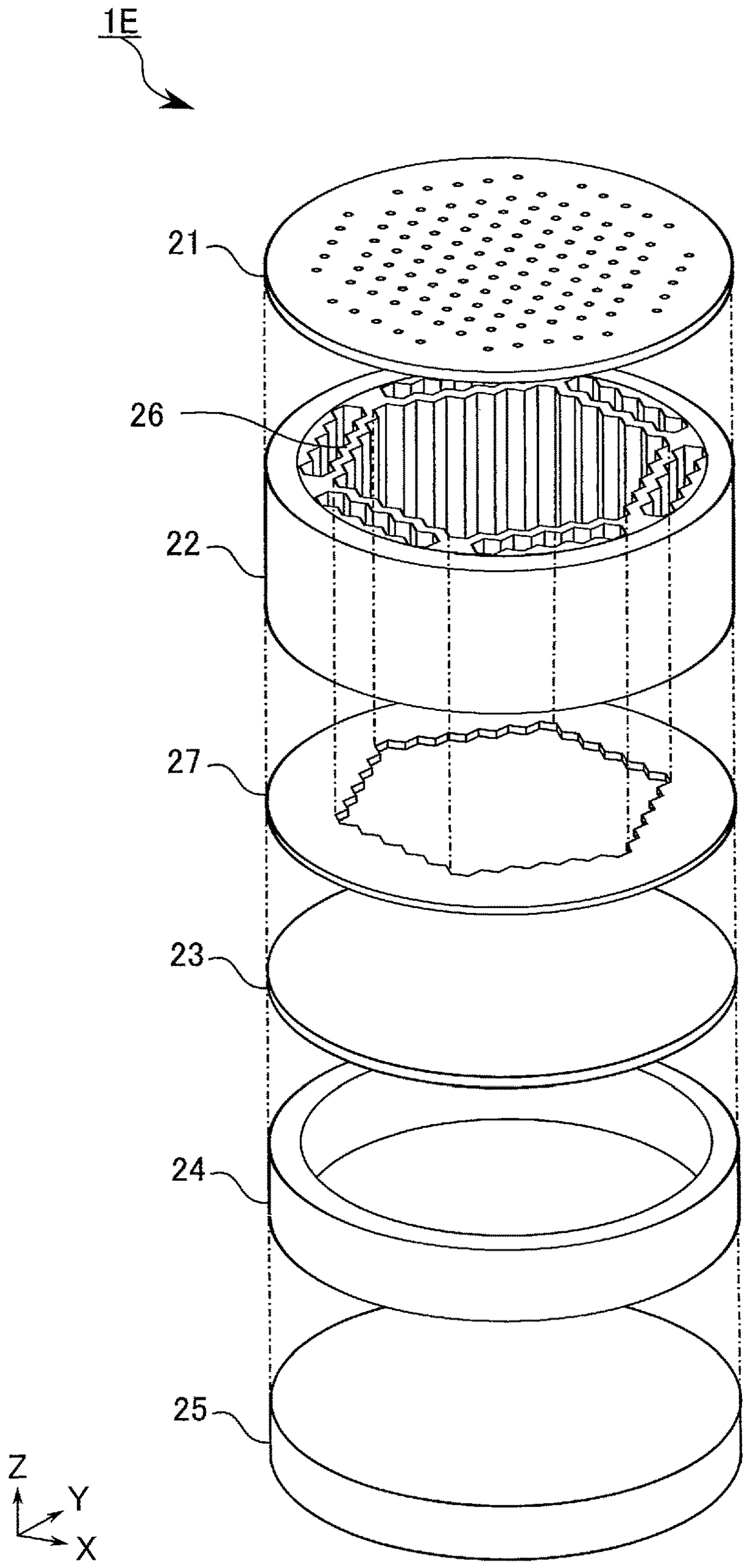
FIG. 22 is an exploded view illustrating an example of an overall configuration of a sound absorption device according to a third modification.
Figure 23:
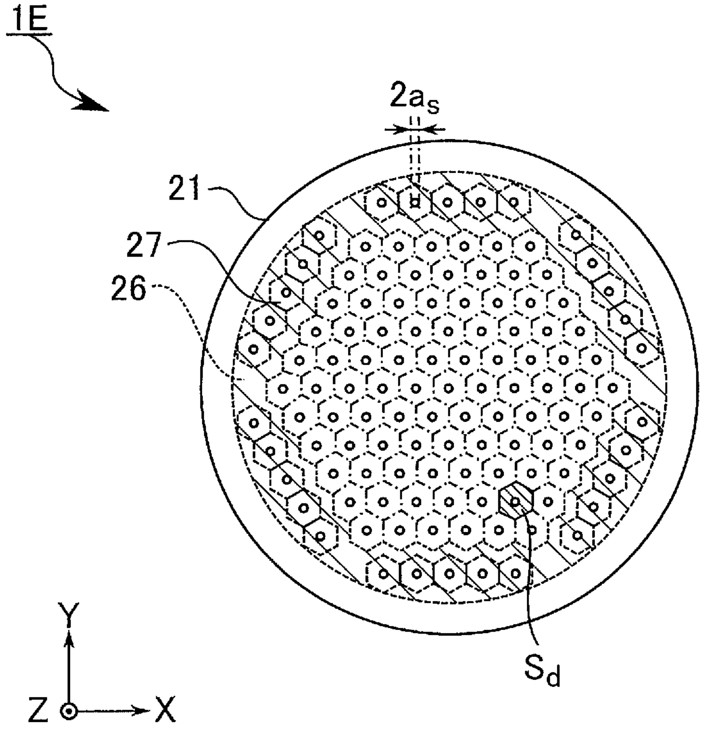
FIG. 23 is a plan view illustrating an example of a planar layout of a plurality of sound holes, a slit, and a lid of the sound absorption device according to the third modification.

FIG. 22 is an exploded view illustrating an example of an overall configuration of a sound absorption device 1E according to the third modification. FIG. 23 is a plan view illustrating an example of a planar layout of a plurality of sound holes, a slit, and a lid of the sound absorption device 1E according to the third modification. FIGS. 22 and 23 correspond to FIGS. 17 and 19 in the first modification of the second embodiment, respectively. As illustrated in FIGS. 22 and 23, the sound absorption device 1E may include a sound hole surface plate 21, a frame 22, an elastic plate 23, a frame 24, a back plate 25, a slit 26, and a lid 27.

The configurations of the sound hole surface plate 21, the frame 22, the elastic plate 23, the frame 24, the back plate 25, the slit 26, and the lid 27 are the same as the configurations of the sound hole surface plate 11, the frame 12, the elastic plate 13, the frame 14, the back plate 15, the slit 19, and the lid 17 except that the shape viewed in the Z direction is circular and that a hole H1 is arranged in a different manner.

An effective dimension portion of the sound hole surface plate 21 is, for example, divided into six peripheral regions corresponding to a portion of the elastic plate 23 having a low vibration speed and one central region corresponding to a portion of the elastic plate 23 having a high vibration speed by the slit 26. Each of the peripheral regions and the central region can be divided into a regular hexagon region having an area $S_d$ in a honeycomb-like manner. Each hole H1 is arranged at the center of the regular hexagon region. The lid 27 has a shape obtained by hollowing out a portion corresponding to the central region. With the above configuration, one hole H1, a hexagonal prism-shaped partial space $SP_i$ having one regular hexagon as a bottom surface, and a corresponding portion of the elastic plate 23 can be regarded $a_s$ one virtual Helmholtz resonator.

According to the third modification, also when the device shape is circular as viewed in the Z direction, the sound absorption characteristics of the sound absorption device 1E can be regarded as a combination of the sound absorption characteristics of a plurality of virtual Helmholtz resonators of a one-degree-of-freedom system and the sound absorption characteristics of a plurality of virtual Helmholtz resonators of a two-degree-of-freedom system. Therefore, the same effects as those of the first embodiment, the second embodiment, and the third embodiment can be obtained.

4.4 Fourth Modification

In addition, for example, in the second embodiment and the third embodiment, the case where the lengths $L_1'$ and $L_1''$ used when calculating a characteristic impedance $Z_{1i}$ are fixed with respect to the device structure has been described, but the present invention is not limited thereto. Hereinafter, as an example, a configuration different from that of the second embodiment will be mainly described assuming a case where a fourth modification is applied to the second embodiment.

Figure 24:
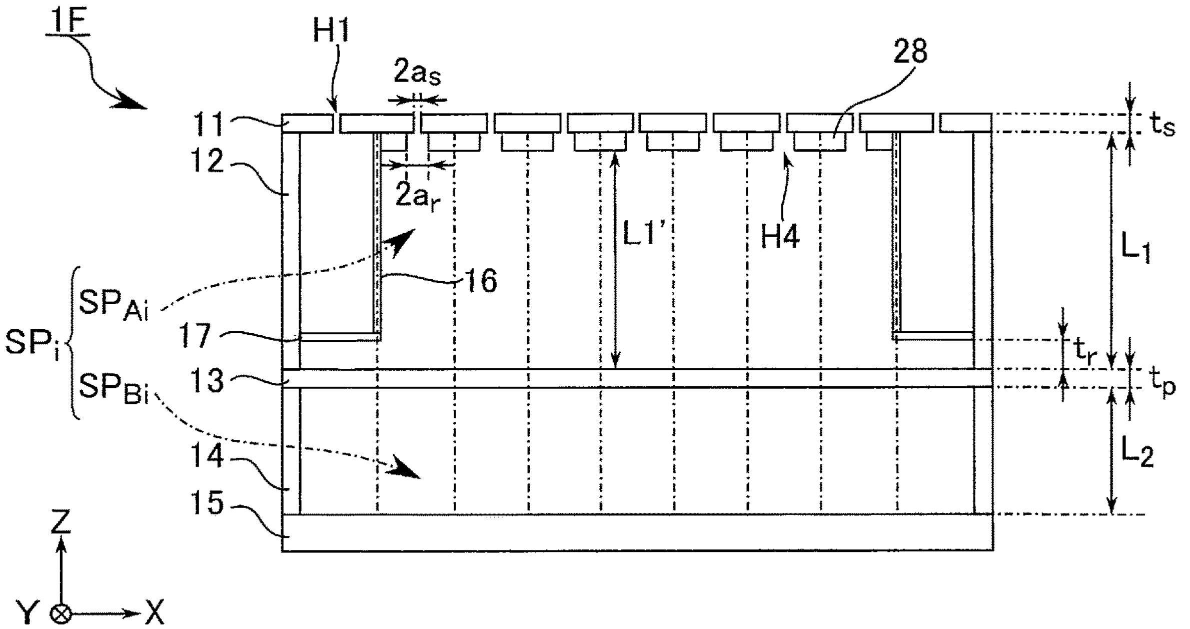
FIG. 24 is a cross-sectional view illustrating a first example of a cross-sectional structure of a sound absorption device according to a fourth modification.

FIG. 24 is a cross-sectional view illustrating a first example of a cross-sectional structure of a sound absorption device 1F according to the fourth modification. As illustrated in FIG. 24, the sound absorption device 1F may further include a lid 28.

The lid 28 is, for example, a plate having a variable thickness. A plurality of holes H4 are formed on the lid 28. The lid 28 is provided on a sound hole surface plate 11 in a partial space $SP_i$ without a lid 17. The number of holes H4 is equal to the number of holes H1 corresponding to partial spaces $SP_i$ without a lid 17. The center of the hole H4 coincides with the center of the corresponding hole H1, for example. A radius $a_r$ of the hole H4 is designed to be twice or more a radius $a_s$ of the hole H1. As a result, in the partial space $SP_i$ with the lid 28 (that is, without the lid 17), the length $L_1'$ used when calculating the characteristic impedance $Z_{1i}$ can be made variable according to the thickness of the lid 28.

According to the first example of the fourth modification, it is possible to easily adjust a deviation generated between a resonance frequency of a Helmholtz resonator of a one-degree-of-freedom system and a frequency at which the dip occurs (dip frequency) in a Helmholtz resonator of a two-degree-of-freedom system after the sound absorption device 1F is assembled.

Figure 25:
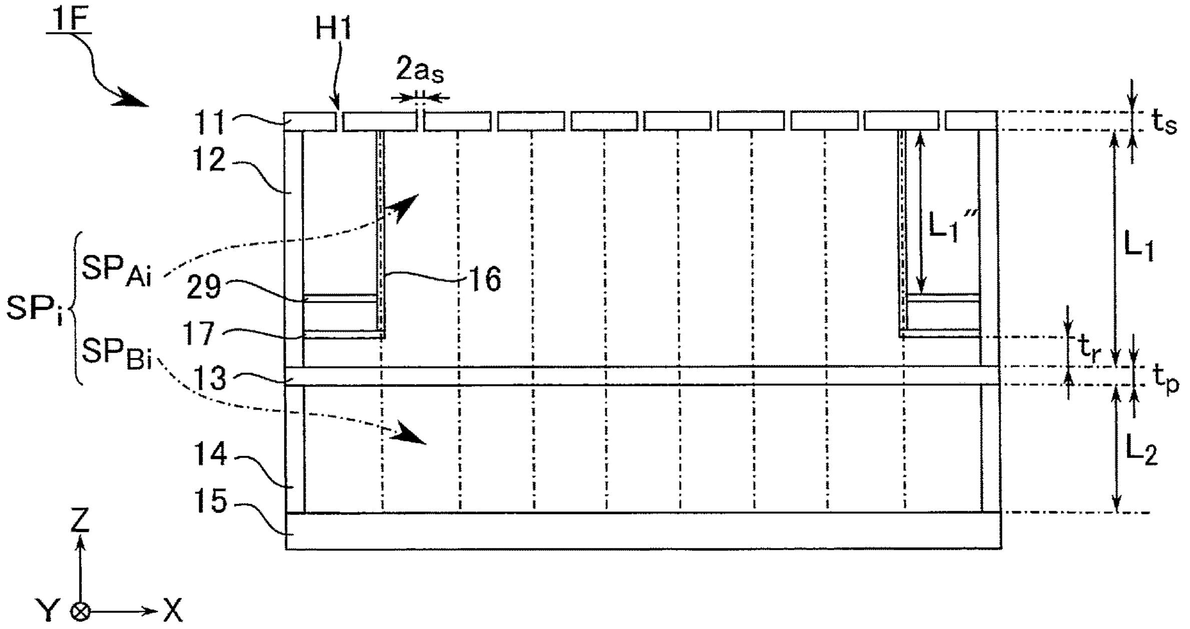
FIG. 25 is a cross-sectional view illustrating a second example of the cross-sectional structure of the sound absorption device according to the fourth modification.

FIG. 25 is a cross-sectional view illustrating a second example of the cross-sectional structure of the sound absorption device 1F according to the fourth modification. As illustrated in FIG. 25, the sound absorption device 1F may further include a lid 29.

The lid 29 is a plate having the same shape as a lid 17. The lid 29 is a plate having significantly higher rigidity than an elastic plate 13. That is, the lid 29 can be regarded as a rigid plate that does not vibrate due to a sound that vibrates the elastic plate 13. The lid 29 is provided so as to further separate a space on the sound hole surface plate 11 side of the partial space $SP_{Ai}$ separated by the lid 17 into two spaces. With the above configuration, in the partial space $SP_i$ with the lid 29 (that is, with the lid 17), the length $L_1''$ used when calculating the characteristic impedance $Z_{1i}$ can be made variable according to the thickness of the lid 29.

According to the second example of the fourth modification, it is possible to easily adjust a deviation generated between the resonance frequency of the Helmholtz resonator of the two-degree-of-freedom system and a natural frequency of the elastic plate 13 after the sound absorption device 1F is assembled.

4.5 Fifth Modification

In addition, for example, in the second embodiment and the third embodiment, a case where a clearance of about 1 mm is provided between the elastic plate 13 and the lid 17 or 18 has been described, but the present invention is not limited thereto. Hereinafter, as an example, a configuration different from that of the second embodiment will be mainly described assuming a case where a fifth modification is applied to the second embodiment.

Figure 26:
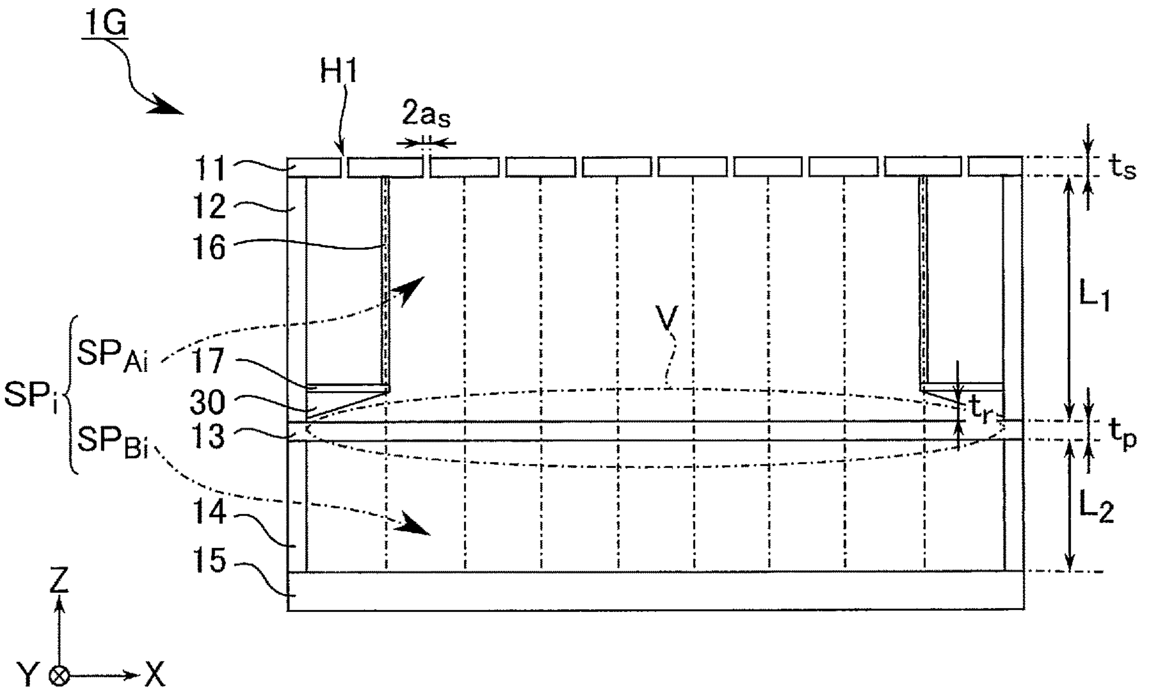
FIG. 26 is a cross-sectional view illustrating a first example of a cross-sectional structure of a sound absorption device according to a fifth modification.

FIG. 26 is a cross-sectional view illustrating a first example of a cross-sectional structure of a sound absorption device 1G according to the fifth modification. As illustrated in FIG. 26, the sound absorption device 1G may further include a lid 30.

The lid 30, for example, has the same shape as a lid 17 when viewed in the Z direction. The lid 30 is provided on a surface of the lid 17 on an elastic plate 13 side. The lid 30 has a tapered shape in which the thickness increases from the center of an internal space $SP_{Ai}$ toward a frame 12.

Specifically, a length $t_r$ of a clearance formed between the lid 30 and the elastic plate 13 narrows from the center of the internal space $SP_{Ai}$ toward the frame 12. The length $t_r$ is preferably shorter within a range in which the elastic plate 13 that vibrates with a vibration width V does not interfere with the lid 30. When the vibration width V of the elastic plate 13 nonlinearly changes from the frame 12 toward the internal space $SP_{Ai}$, the taper ratio of the thickness of the lid 30 may not be constant. The lid 30 may be molded integrally with the lid 17 and a slit 16.

According to the first example of the fifth modification, it is possible to reduce the clearance generated between the lid 30 and the elastic plate 13 while avoiding the hindrance of the vibration of the elastic plate 13 by the lid 30. As a result, it is possible to reduce a difference between lengths $L_1'$ and $L_1''$ used when calculating a characteristic impedance $Z_{1i}$. Therefore, it is possible to reduce a deviation generated between a resonance frequency of a Helmholtz resonator of a one-degree-of-freedom system and a dip frequency of a Helmholtz resonator of a two-degree-of-freedom system.

Figure 27:
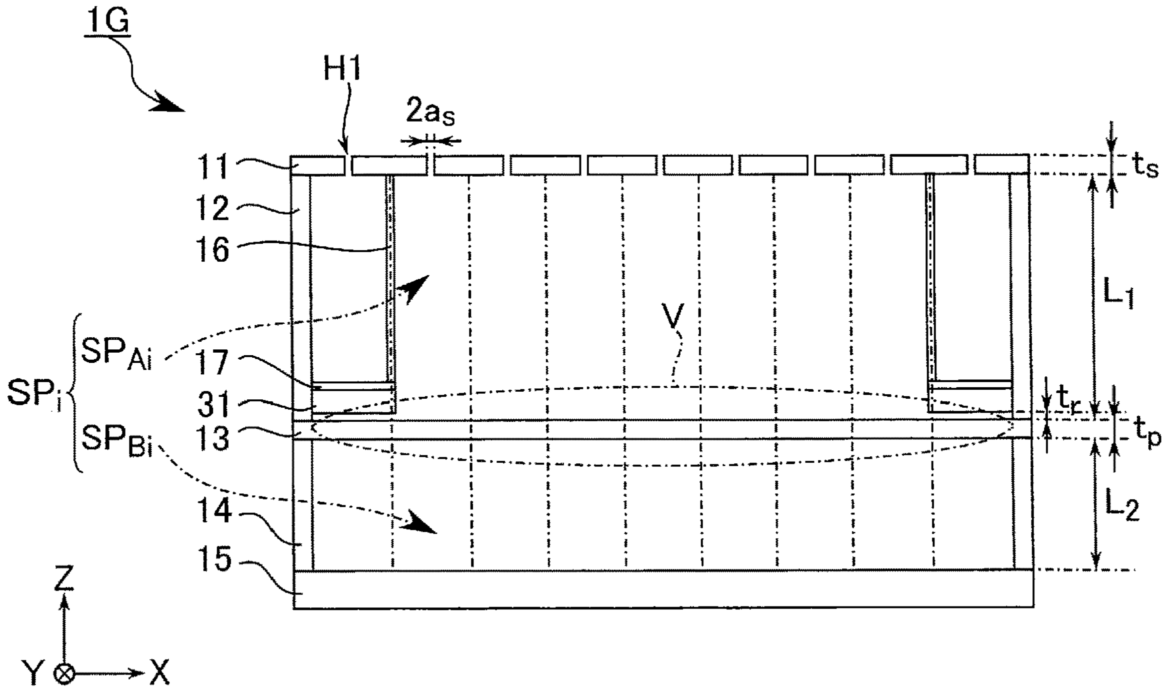
FIG. 27 is a cross-sectional view illustrating a second example of the cross-sectional structure of the sound absorption device according to the fifth modification.

FIG. 27 is a cross-sectional view illustrating a second example of the cross-sectional structure of the sound absorption device 1G according to the fifth modification. As illustrated in FIG. 27, the sound absorption device 1G may further include a lid 31.

The lid 31, for example, has the same shape as the lid 17 when viewed in the Z direction. The lid 17 is a plate having a constant thickness. The lid 31 is provided on the surface of the lid 17 on the elastic plate 13 side. A material that is soft enough not to hinder the vibration of the elastic plate 13 is applied to the lid 31. For example, the lid 31 includes a low hardness material such as silicone rubber.

A length $t_r$ of a clearance formed between the lid 31 and the elastic plate 13 is short enough to allow the elastic plate 13 vibrating with the vibration width V to interfere with the lid 30. The length $t_r$ can be designed to be, for example, about 0.2 millimeters.

According to the second example of the fifth modification, the lid 31 makes contact with the elastic plate 13 due to the vibration of the elastic plate 13. However, the lid 31 can deform to such an extent that the lid 31 does not hinder the vibration of the elastic plate 13. As a result, it is possible to reduce the clearance generated between the lid 31 and the elastic plate 13 while avoiding the hindrance of the vibration of the elastic plate 13 by the lid 31. Therefore, the same effects as those of the first example of the fifth embodiment can be obtained.

In addition, the lid 31 can also function as a damping material of the elastic plate 13. Thus, the dip between the peaks can be reduced.

4.6 Sixth Modification

In addition, for example, in the second embodiment and the third embodiment, the case where substantially the same aperture ratio p is applied to the Helmholtz resonator of the one-degree-of-freedom system and the Helmholtz resonator of the two-degree-of-freedom system has been described, but the present invention is not limited thereto. Hereinafter, as an example, a configuration different from that of the second embodiment will be mainly described assuming a case where a sixth modification is applied to the second embodiment.

Figure 28:
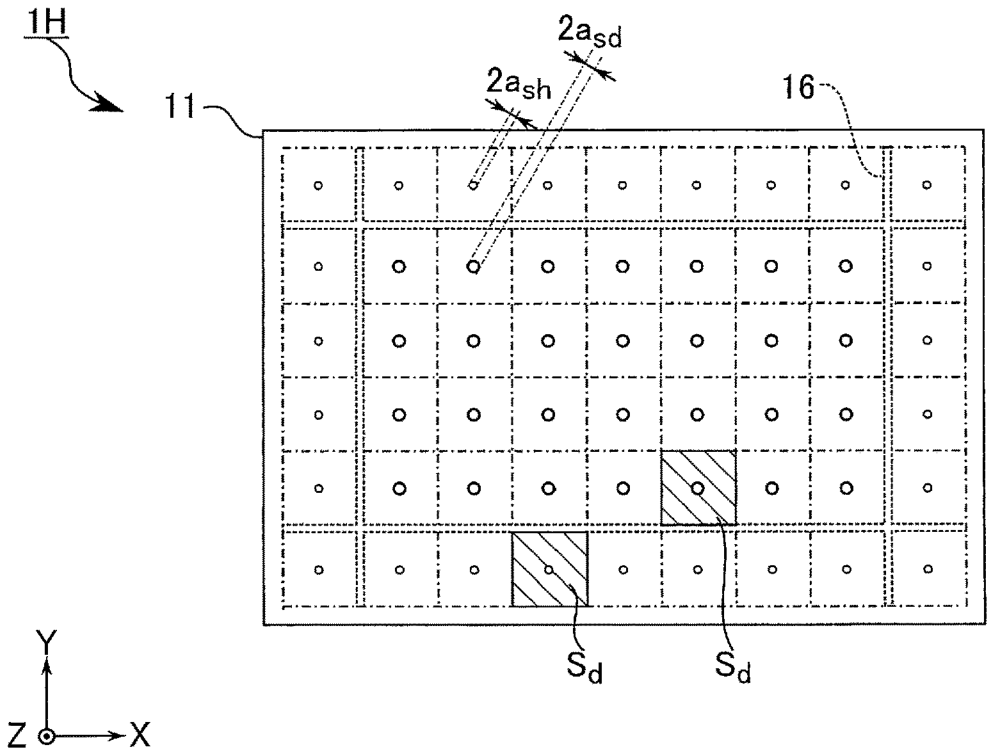
FIG. 28 is a plan view illustrating a first example of a planar layout of a plurality of sound holes and a slit of a sound absorption device according to a sixth modification.

FIG. 28 is a plan view illustrating a first example of a planar layout of a plurality of sound holes and a slit of a sound absorption device 1H according to the sixth modification.

As illustrated in FIG. 28, a radius $a_{sd}$ of a hole H1 corresponding to a partial space $SP_{Ai}$ functioning $a_s$ the Helmholtz resonator of the two-degree-of-freedom system and a radius ash of a hole H1 corresponding to a partial space $SP_{Ai}$ functioning $a_s$ the Helmholtz resonator of the one-degree-of-freedom system may be designed to satisfy the following formula (21).

$$\alpha_{sh}^2 L_1' = \alpha_{sd}^2 L_1'' \quad (21)$$

In this case, the radius ash is shorter than the radius $a_{sd}$. The area of a region of an elastic plate 13 corresponding to the partial space $SP_{Ai}$ functioning as the Helmholtz resonator of the two-degree-of-freedom system and the area of a region of the elastic plate 13 corresponding to the partial space $SP_{Ai}$ functioning as the Helmholtz resonator of the one-degree-of-freedom system are both $S_d$ and are equal to each other.

According to the first example of the sixth modification, it is possible to offset the influence of applying different correction amounts to a length $L_1$ according to the presence or absence of a lid 17. Therefore, it is possible to suppress a deviation between a characteristic impedance calculated from a design value of the length $L_1$ based on the design guideline and an actual characteristic impedance.

Figure 29:
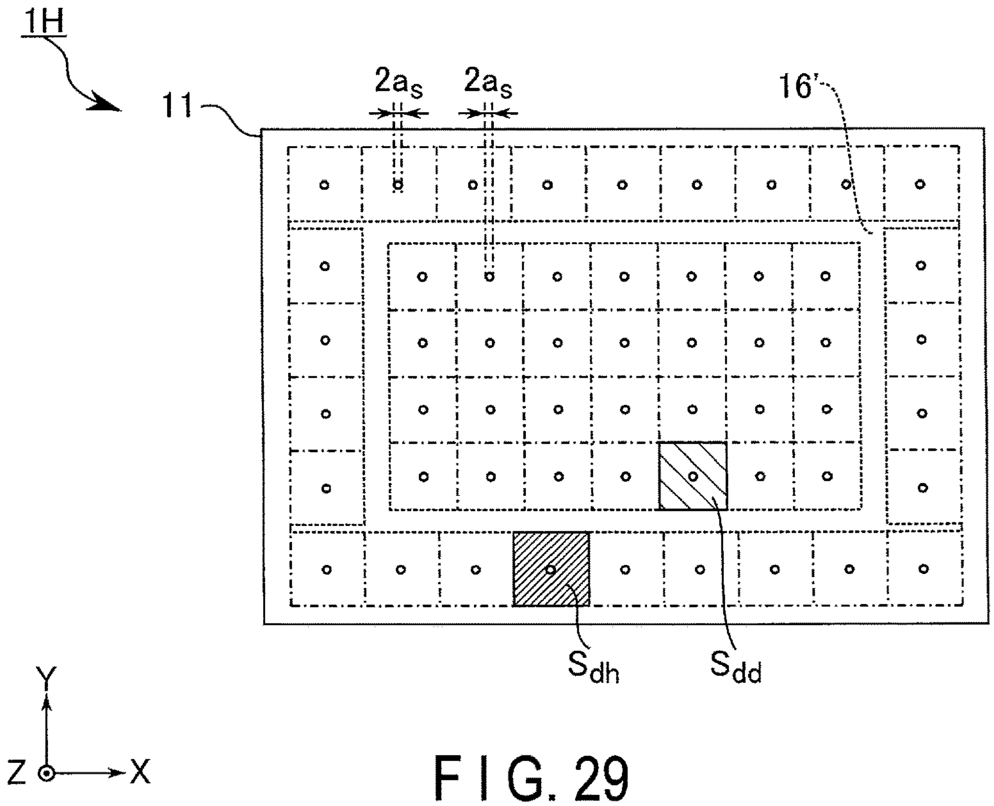
FIG. 29 is a plan view illustrating a second example of the planar layout of the plurality of sound holes and the slit of the sound absorption device according to the sixth modification.

FIG. 29 is a plan view illustrating a second example of the planar layout of the plurality of sound holes and the slit of the sound absorption device 1H according to the sixth modification. In FIG. 29, instead of the slit 16, a slit 16' connected to a portion of the frame 12 extending in the Y direction and not connected to a portion of the frame 12 extending in the X direction is illustrated for convenience of description.

As illustrated in FIG. 29, an area $S_{dd}$ of the region of the elastic plate 13 corresponding to the partial space $SP_{Ai}$ functioning $a_s$ the Helmholtz resonator of the two-degree-of-freedom system and an area $S_{dh}$ of the region of the elastic plate 13 corresponding to the partial space $SP_{Ai}$ functioning as the Helmholtz resonator of the one-degree-of-freedom system may be designed so as to satisfy the following formula (22).

$$S_{dh} L_1'''' S_{dd} L_1' \quad (22)$$

In this case, the area $S_{dh}$ is larger than the area $S_{dd}$. The radius of the hole H1 corresponding to the partial space $SP_{Ai}$ functioning as the Helmholtz resonator of the two-degree-of-freedom system and the radius of the hole H1 corresponding to the partial space $SP_{Ai}$ functioning as the Helmholtz resonator of the one-degree-of-freedom system are both $a_s$ and are equal to each other.

According to the second example of the sixth modification, it is possible to offset the influence of applying different correction amounts to the length $L_1$ according to the presence or absence of the lid 17. Therefore, it is possible to suppress a deviation between a characteristic impedance calculated from a design value of the length $L_1$ based on the design guideline and an actual characteristic impedance.

4.7 Seventh Modification

In addition, for example, the method for supporting the elastic plate 13 at the frames 12 and 14 may be fixed support or simple support.

Figure 30:
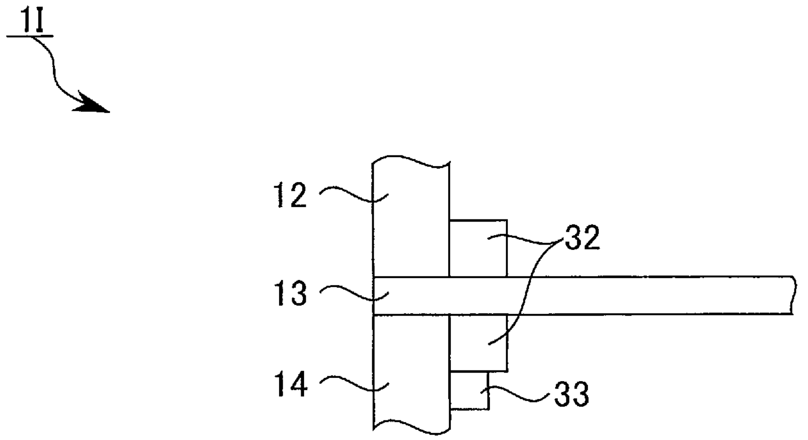
FIG. 30 is a cross-sectional view illustrating a first example of a cross-sectional structure at an end of an elastic plate of a sound absorption device according to a seventh modification.

FIG. 30 is a cross-sectional view illustrating a first example of a cross-sectional structure at the end of an elastic plate of a sound absorption device 1I according to a seventh modification. As illustrated in FIG. 30, when the end of the elastic plate 13 is fixedly supported, a portion of each of the frames 12 and 14 in contact with the elastic plate 13 is a flat surface.

When the end of the elastic plate 13 is fixedly supported, the sound absorption device 1I may further include an elastic material 32. The elastic material 32 is, for example, a member having higher elasticity than the frames 12 and 14, such as rubber. The elastic material 32 is connected to at least one of the frames 12 and 14 to support the end of the elastic plate 13 together with the frames 12 and 14. As a result, a support boundary condition of the elastic plate 13 can be changed. Thus, a natural frequency of the elastic plate 13 can be adjusted. In addition, the elastic material 32 can also function as a damping material of the elastic plate 13.

The sound absorption device 1I may further include an actuator 33. The actuator 33 is a pressurizing actuator. The actuator 33 is attached to the elastic material 32 and thereby has a function of pressurizing the elastic material 32. As a result, it is possible to adjust the change amount of the support boundary condition of the elastic plate 13 by the elastic material 32.

Figure 31:
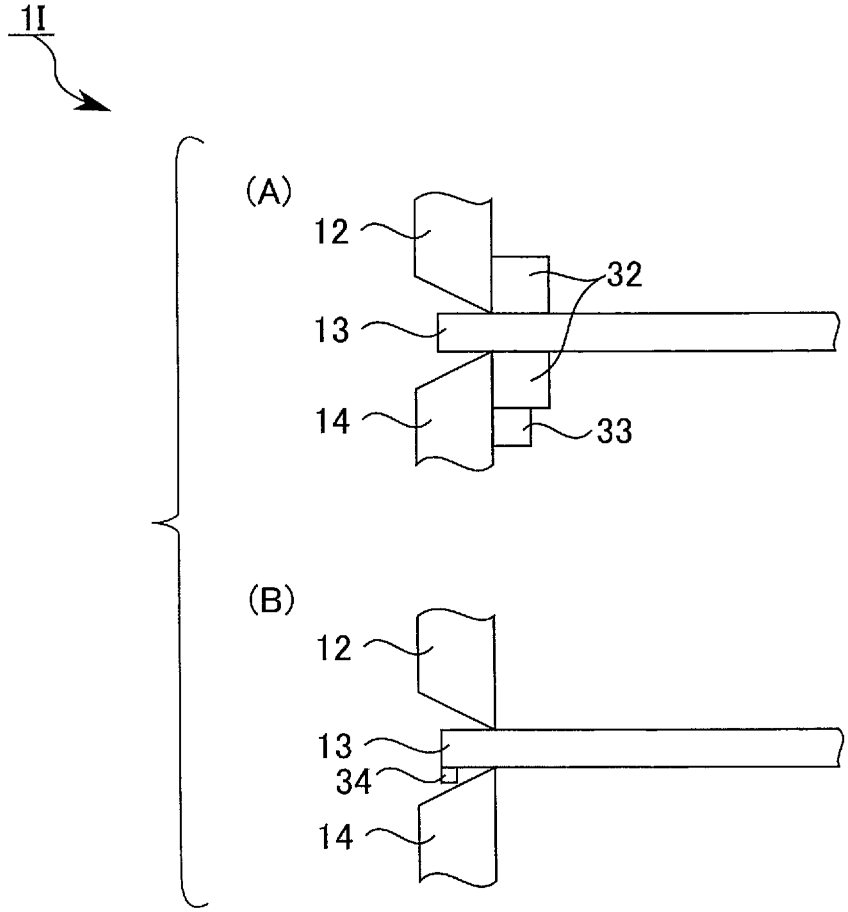
FIG. 31 is a cross-sectional view illustrating a second example of the cross-sectional structure at the end of the elastic plate of the sound absorption device according to the seventh modification.

FIG. 31 is a cross-sectional view illustrating a second example of a cross-sectional structure at the end of the elastic plate of the sound absorption device 1I according to the seventh modification. As illustrated in FIG. 31, when the end of the elastic plate 13 is simply supported, a portion of each of the frames 12 and 14 in contact with the elastic plate 13 has a knife-edge shape.

When the end of the elastic plate 13 is simply supported, as illustrated in a portion (A) of FIG. 31, the sound absorption device 1I may further include the elastic material 32 and the actuator 33 as in the case where the end of the elastic plate 13 is fixedly supported.

In addition, when the end of the elastic plate 13 is simply supported, the sound absorption device 1I may further include a weight 34 as illustrated in a portion (B) of FIG. 31. The weight 34 is installed to, for example, a portion of the elastic plate 13 protruding from the point of support by the frames 12 and 14 toward an external space. As a result, the moment generated in the elastic plate 13 at the point of support by the frames 12 and 14 can be changed. Thus, a natural frequency of the elastic plate 13 can be adjusted.

4.8 Eighth Modification

In addition, for example, in the first embodiment, the second embodiment, and the third embodiment, the case where one elastic plate is provided for one sound absorption device has been described, but the present invention is not limited thereto. For example, one elastic plate may be provided for a plurality of sound absorption devices. Hereinafter, as an example, a configuration different from that of the first embodiment will be mainly described assuming a case where an eighth modification is applied to the first embodiment.

Figure 32:
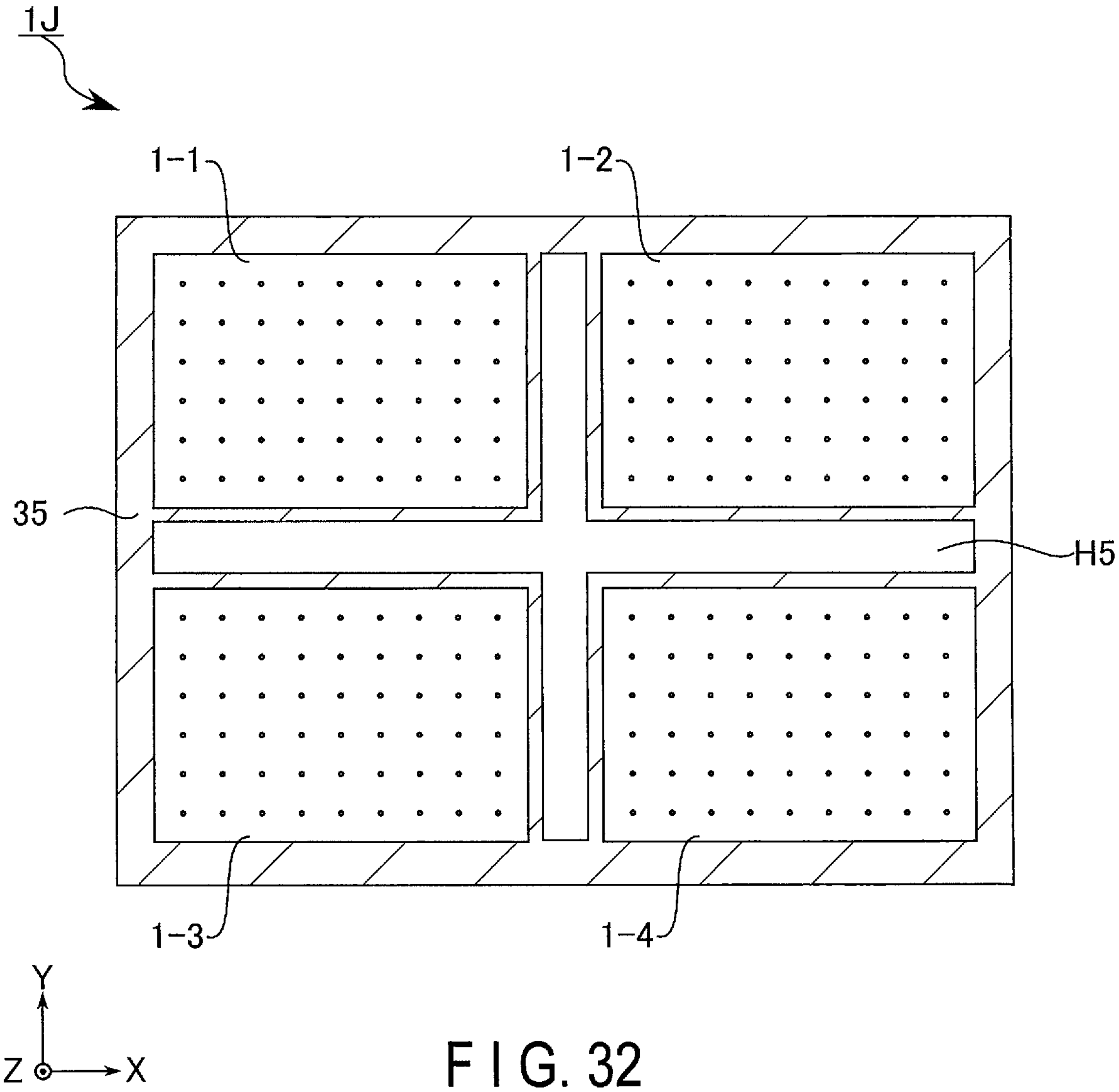
FIG. 32 is a plan view illustrating an example of a planar layout of a sound absorption device according to an eighth modification.

FIG. 32 is a plan view illustrating an example of a planar layout of a sound absorption device 1J according to the eighth modification. As illustrated in FIG. 32, the sound absorption device 1J may include four sub sound absorption devices 1-1, 1-2, 1-3, and 1-4, and an elastic plate 35. Each of the sub sound absorption devices 1-1 to 1-4 has the same configuration as the sound absorption device 1 in the first embodiment except for the configuration of the elastic plate 13, for example.

The elastic plate 35 is, for example, a plate having an area larger than the total area of the sub sound absorption devices 1-1 to 1-4 when viewed in the Z direction. The elastic plate 35 is supported by frames 12 and 14 of each of the sub sound absorption devices 1-1 to 1-4. As a result, the degree of freedom in designing the elastic plate 35 can be further improved.

A hole H5 may be formed in the elastic plate 35. For example, the hole H5 is formed such that a region of the elastic plate 35 between the sub sound absorption devices 1-1, 1-2, 1-3, and 1-4 is hollowed out. As a result, it is possible to reduce the influence of the vibration of a portion of the elastic plate 35 corresponding to one of the sub sound absorption devices 1-1 to 1-4 on the vibration of a portion of the elastic plate 35 corresponding to the other three of the sub sound absorption devices 1-1 to 1-4, while reducing the weight of the sound absorption device 1J.

4.9 Other Modifications

A sound absorption material (not illustrated) may be provided on a surface of the sound hole surface plate 11. For example, the sound absorption material having a size larger than that of a hole H1 is attached to the periphery of the hole H1 for each hole H1. With this configuration, it is possible to change an air viscous resistance R in the hole H1 without changing a radius $a_s$, a depth $t_s$, and the like of the hole H1, and to obtain more preferable sound absorption characteristics. When the sound absorption material is provided on a surface of the sound hole surface plate 11 on an internal space RA side, the thickness of the sound absorption material can be further considered in designing a length $L_1$. When the sound absorption material is provided on a surface of the sound hole surface plate 11 on an external space side, it is unnecessary to correct the length $L_1$ based on the sound absorption material.

A damping material (not illustrated) may be provided on a surface of an elastic plate 13. It is preferable that the damping material be attached so $a_s$ not to hinder the vibration of the elastic plate 13 in a primary vibration mode. Specifically, for example, when the elastic plate 13 has a rectangular shape, the damping material is attached along a long side direction (X direction). For example, when the elastic plate 13 has a circular shape, the damping material is attached radially from the center. When the thickness of the elastic plate 13 is thin, the damping material may be, for example, a poly-vinyl chloride (PVC) tape. With this configuration, it is possible to change a loss coefficient $\eta$ of the elastic plate 13 and thus obtain more preferable sound absorption characteristics.

Instead of the damping material, a piezoelectric element (not illustrated) may be provided on the surface of the elastic plate 13. With this configuration, it is possible to achieve the same effects as those in the case where the damping material is provided on the elastic plate 13.

A rib (not illustrated) may be provided on the surface of elastic plate 13. With this configuration, it is possible to change a vibration speed distribution of the elastic plate 13 and thus obtain more preferable sound absorption characteristics.

The thickness and the material of the elastic plate 13 may not be constant depending on a partial space $SP_i$. The thickness and the material of the elastic plate 13 may be changed for each partial space $SP_i$. With this configuration, it is possible to achieve the same effects as those in the case where the rib is provided on the elastic plate 13.

When the elastic plate 13 has a rectangular shape, the number of sides of the elastic plate 13 supported by frames 12 and 14 may not be four. For example, only two facing sides of the elastic plate 13 may be supported by the frames 12 and 14. With this configuration, support conditions and a natural vibration mode of the elastic plate 13 can be changed. Therefore, it is possible to easily adjust a natural frequency of the elastic plate 13 so as to coincide with a frequency $f_0$ subject to sound absorption.

In addition, the sound absorption device 1 can be designed based on not only a (1,1) vibration mode, but also an arbitrary vibration mode. For example, when a second-order vibration mode is applied, a region of the elastic plate 13 having a low vibration speed is generated in a region corresponding to the middle line of a long side or the middle line of a short side, as well as on the end of elastic plate 13. When the second-order or higher vibration mode is applied, another region of the elastic plate 13 having a low vibration speed may be partitioned by a slit 16 and a lid 17, in addition to the end of elastic plate 13.

Furthermore, the XY plane in the sound absorption device 1 is not limited to a flat surface, and may be a curved surface. Thus, it is possible to cope with a case where the sound absorption device 1 is applied to a structure having a curvature such as a cylindrical duct.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound absorption device comprising:
- a first plate having a plurality of first holes;
- a second plate facing the first plate in a first direction;
- a first frame connecting the first plate and the second plate; and
- a third plate supported by the first frame so as to vibrate in the first direction within the first frame, wherein
- a first space is formed in the first frame between the first plate and the third plate,
- a second space is formed in the first frame between the second plate and the third plate,
- the third plate includes a first portion and a second portion, the second portion having a higher vibration speed than the first portion,
- the second space is separated from an external space of the sound absorption device by the second plate and the first frame, and
- the third plate has low rigidity compared to the first plate, the second plate, and the first frame.

2. The sound absorption device according to claim 1, further comprising a member extending in the first direction and partitioning the first space into a first partial space and a second partial space, wherein
- the first partial space overlaps the first portion of the third plate when viewed in the first direction, and
- the second partial space overlaps the second portion of the third plate when viewed in the first direction.

3. The sound absorption device according to claim 2, further comprising
- a fourth plate separating the first partial space into a first plate side and a third plate side.

4. The sound absorption device according to claim 3, wherein
- the fourth plate has a second hole connecting the first plate side and the third plate side in the second partial space, and
- a diameter of the second hole is equal to or larger than a diameter of the first hole and less than a diameter of the second partial space when viewed in the first direction.

5. The sound absorption device according to claim 2,
- wherein the first partial space surrounds the second partial space when viewed in the first direction.

6. The sound absorption device according to claim 2, wherein
- a sum of the number of the first partial spaces and the number of the second partial spaces is equal to the number of the first holes.

7. The sound absorption device according to claim 2, wherein
- a sum of the number of the first partial spaces and the number of the second partial spaces is smaller than the number of the first holes.

8. The sound absorption device according to claim 1, wherein
- the third plate has a third hole connecting the first space and the second space.

9. The sound absorption device according to claim 3, further comprising
- a fourth plate provided on a surface of the first plate in the second partial space and having a plurality of fourth holes corresponding to the first holes,
- wherein a diameter of the fourth hole is twice or more the diameter of the first hole.

10. The sound absorption device according to claim 3, further comprising
- a fifth plate provided between the first plate and the fourth plate in the first partial space.

11. The sound absorption device according to claim 3, wherein
- the fourth plate has a tapered shape in which a thickness increases toward the first frame.

12. The sound absorption device according to claim 3, wherein the fourth plate includes silicone rubber.

13. The sound absorption device according to claim 2, wherein a diameter of a first hole corresponding to the first partial space among the first holes is smaller than a diameter of a first hole corresponding to the second partial space.

14. The sound absorption device according to claim 2, wherein an area of a region corresponding to one of the first holes in the first partial space is larger than an area of a region corresponding to one of the first holes in the second partial space.

15. The sound absorption device according to claim 1, wherein the third plate is fixedly supported by the first frame.

16. The sound absorption device according to claim 1, wherein the third plate is simply supported by the first frame.

17. The sound absorption device according to claim 1, further comprising:

a sixth plate having a plurality of fifth holes;

a seventh plate facing the sixth plate in the first direction; and a second frame connecting the sixth plate and the seventh plate, wherein the third plate is supported by the second frame so as to vibrate in the first direction within the second frame, a third internal space is formed in the second frame between the sixth plate and the third plate, and a fourth internal space is formed in the second frame between the seventh plate and the third plate.

18. The sound absorption device according to claim 17, wherein the third plate has a sixth hole between the first frame and the second frame.

19. The sound absorption device according to claim 1, wherein a first length between the first plate and the third plate is determined such that a first frequency corresponding to the first space is a second frequency based on a diameter of the first hole, a depth of the first hole, and an aperture ratio of the first hole, each of which is determined in advance, and a second length between the second plate and the third plate is determined such that a third frequency corresponding to the third plate is the first frequency.

20. The sound absorption device according to claim 19, wherein a depth of the first hole is adjusted based on the determined first length such that a peak of a sound absorption coefficient of the sound absorption device is high, and the first length is further adjusted such that the first frequency is the second frequency based on the adjusted depth of the first hole.

* * * * *